(12) United States Patent  
Ruan et al.

(10) Patent No.: US 12,537,547 B2  
(45) Date of Patent: Jan. 27, 2026

(54) SHORT-RANGE COMMUNICATIONS APPARATUS, CHIP, AND CONTROL METHOD

(71) Applicant: HUAWEI TECHNOLOGIES CO., LTD., Guangdong (CN)

(72) Inventors: Wei Ruan, Shanghai (CN); Xuqiang Shen, Shenzhen (CN); Theng Tee Yeo, Singapore (SG); Lu Li, Shanghai (CN); Cong Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 400 days.

(21) Appl. No.: 18/192,047

(22) Filed: Mar. 29, 2023

(65) Prior Publication Data

US 2023/0238986 A1   Jul. 27, 2023

Related U.S. Application Data

(63) Continuation of application No. PCT/CN2020/119532, filed on Sep. 30, 2020.

(51) Int. Cl.  
*H04B 7/00* (2006.01)  
*H04B 1/00* (2006.01)  
*H04B 1/04* (2006.01)

(52) U.S. Cl.  
CPC .......... *H04B 1/0078* (2013.01); *H04B 1/006* (2013.01); *H04B 2001/0408* (2013.01)

(58) Field of Classification Search  
CPC ........ H04B 1/0053; H04B 1/006; H04B 1/06; H04B 1/16; H04B 1/18; H04B 7/0817; H04W 4/80  
See application file for complete search history.

(56) References Cited

U.S. PATENT DOCUMENTS

| | | | |
|---|---|---|---|
| 8,565,703 B2 * | 10/2013 | Vahidfar | H03G 3/3052 455/226.1 |
| 2007/0184811 A1 | 8/2007 | Ballantyne | |
| 2007/0207752 A1 * | 9/2007 | Behzad | H04B 1/18 455/132 |

(Continued)

FOREIGN PATENT DOCUMENTS

| CN | 108023602 A | 5/2018 |
|---|---|---|
| CN | 109121228 A | 1/2019 |

OTHER PUBLICATIONS

Extended European Search Report issued in EP20955746.1, dated Sep. 22, 2023, 8 pages.

(Continued)

*Primary Examiner* — Tuan Pham

(57) ABSTRACT

A short-range communications apparatus, a chip, and a control method are disclosed. The apparatus includes: a gain unit, coupled to an antenna; a first radio frequency (RF) receive channel, coupled to the gain unit; a first baseband processor, coupled to the first RF receive channel, and configured to receive a first signal from the antenna through the first RF receive channel; a second RF receive channel, coupled to the gain unit; and a second baseband processor, coupled to the second RF receive channel, and configured to receive a second signal from the antenna through the second RF receive channel.

14 Claims, 13 Drawing Sheets

(56) References Cited

U.S. PATENT DOCUMENTS

| | | | | |
|---|---|---|---|---|
| 2011/0122929 | A1* | 5/2011 | Razzell | H04B 1/7183 |
| | | | | 375/354 |
| 2018/0226932 | A1 | 8/2018 | Beaudin et al. | |
| 2021/0119649 | A1* | 4/2021 | Kang | H04B 1/1615 |

OTHER PUBLICATIONS

IEEE Standard for Information technology, Telecommunications and information exchange between systems, Local and metropolitan area networks, Specific requirements, Part 11: Wireless LAN Medium Access Control (MAC) and Physical Layer (PHY) Specifications, Amendment 4: Enhancements for Very High, Throughput for Operation in Bands below 6 GHz, IEEE Computer Society, Sponsored by the LAN/MAN Standards Committee, IEEE Std 802.11ac-2013, Dec. 11, 2013, total 425 pages.

IEEE Standard for Information technology, Telecommunications and information exchange between systems, Local and metropolitan area networks, Specific requirements, Part 11: Wireless LAN Medium Access Control (MAC) and Physical Layer (PHY) Specifications, Amendment 5: Enhancements for Higher, Throughput, IEEE Computer Society, Sponsored by the LAN/MAN Standards Committee, IEEE Std 802.11n-2009, Sep. 11, 2009, total 536 pages.

IEEE P802.11ax/D6.0 , Draft Standard for Information technology, Tele communications and information exchange between systems Local and metropolitan area networks, Specific requirements, Part 11: Wireless LAN Medium Access Control , (MAC) and Physical Layer (PHY) Specifications, Amendment 1: Enhancements for High Efficiency, WLAN, Prepared by the 802.11 Working Group of the LAN/MAN Standards Committee of the IEEE Computer Society, Nov. 2019, total 780 pages.

Supplement to IEEE Standard for Information technology, Telecommunications and information exchange between systems, Local and metropolitan area networks, Specific requirements, Part 11: Wireless LAN Medium Access Control (MAC) and Physical Layer (PHY) specifications: Higher-Speed Physical Layer Extension in the 2.4 GHz Band, IEEE Std 802.11b-1999 (Supplement to ANSI/IEEE Std 802.11, 1999 Edition), Sep. 16, 1999, total 97 pages.

International Search Report and Written Opinion issued in PCT/CN2020/119532, dated Jun. 30, 2021, 10 pages.

* cited by examiner

Transmit end 100                                    Receive end 200

SHORT-RANGE COMMUNICATIONS APPARATUS, CHIP, AND CONTROL METHOD

CROSS-REFERENCE TO RELATED APPLICATIONS

This application is a continuation of International Application No. PCT/CN2020/119532, filed on Sep. 30, 2020, the disclosure of which is hereby incorporated by reference in its entirety.

TECHNICAL FIELD

Embodiments of the present disclosure relate to the short-range communications field, and in particular, to a short-range communications apparatus, a chip, and a control method.

BACKGROUND

Currently, a priority-based control mechanism is usually used in a mechanism in which a bluetooth module and a wireless fidelity (Wi-Fi) module share a low noise amplifier (LNA). To be specific, a module with a higher priority may obtain control permission over the shared LNA, to control a gain level of the shared LNA.

However, in this mechanism, because different gain levels of the bluetooth module and the Wi-Fi module for a signal correspond to different adjustment thresholds, after the gain level of the shared LNA is adjusted, an anti-interference capability of the bluetooth module is decreased or a throughput of the Wi-Fi module is reduced.

SUMMARY

To resolve the foregoing technical problems, the present disclosure provides a short-range communications apparatus, a chip, and a control method, to effectively improve an anti-interference capability and a throughput of the apparatus.

According to a first aspect, a short-range communications apparatus is provided. The apparatus includes: a gain unit, coupled to an antenna; a first radio frequency (RF) receive channel, coupled to the gain unit; a first baseband processor, coupled to the first RF receive channel, and configured to receive a first signal from the antenna through the first RF receive channel; a second RF receive channel, coupled to the gain unit; and a second baseband processor, coupled to the second RF receive channel, and configured to receive a second signal from the antenna through the second RF receive channel. A first bypass switch is disposed between the second RF receive channel and the gain unit, and the first bypass switch is configured to selectively bypass at least one gain device in the gain unit. In this way, according to the present disclosure, an anti-interference capability and a throughput of the apparatus can be effectively improved. For example, the first baseband processor may be a Wi-Fi baseband module, and the second baseband processor may be a bluetooth baseband module. Correspondingly, the first signal may be a Wi-Fi signal, and the second signal may be a bluetooth signal. For example, the first baseband processor and the second baseband processor each may alternatively be another baseband processor, baseband module, or chip applied to short-range communication.

According to the first aspect, the gain unit includes a first low noise amplifier (LNA). An input port of the first LNA is coupled to the antenna, and an output port of the first LNA is coupled to the first RF receive channel. The first bypass switch is separately coupled to the output port of the first LNA and the input port of the first LNA, and is configured to selectively bypass the first LNA. In this way, the first LNA is bypassed, to prevent an adjustment to gain amplitude of the first LNA from being affected by a strength of the second signal, thereby effectively increasing a throughput of the first baseband processor. In addition, when the first LNA is bypassed, gain amplitude of the second signal may be reduced. For example, the first LNA may be an external LNA, or may be an internal LNA.

According to any one of the first aspect or the implementations of the first aspect, the first bypass switch is configured to selectively bypass the first LNA based on whether a strength of the second signal is greater than a first threshold. In this way, based on the strength of the second signal, the first LNA is bypassed, to control the gain amplitude of the second signal input into the second baseband processor, and a gain level of the first LNA does not need to be adjusted.

According to any one of the first aspect or the implementations of the first aspect, the gain unit includes a first LNA and a power attenuator. An output port of the first LNA is separately coupled to the first RF receive channel and an input port of the power attenuator, and an input port of the first LNA is coupled to the antenna; and the first bypass switch is separately coupled to the input port of the power attenuator and an output port of the power attenuator, and is configured to selectively bypass the power attenuator. In this way, the power attenuator is selectively bypassed, to control the gain amplitude of the second signal input into the second baseband processor, and the gain level of the first LNA does not need to be adjusted.

According to any one of the first aspect or the implementations of the first aspect, the first bypass switch is configured to selectively bypass the power attenuator based on whether a strength of the second signal is greater than a second threshold. In this way, based on the strength of the second signal, the power attenuator is selectively bypassed, to control the gain amplitude of the second signal input into the second baseband processor, and the gain level of the first LNA does not need to be adjusted.

According to any one of the first aspect or the implementations of the first aspect, a second bypass switch is disposed between the first LNA and the power attenuator, the second bypass switch is separately coupled to the input port of the first LNA and the output port of the first LNA, and the second bypass switch is configured to selectively bypass the first LNA; and the first bypass switch is separately coupled to the input port of the power attenuator and the output port of the power attenuator, and is configured to selectively bypass the power attenuator. Therefore, the first LNA is selectively bypassed, and the power amplifier is selectively bypassed, to control the gain amplitude of the second signal input into the second baseband processor, and the gain level of the first LNA does not need to be adjusted.

According to any one of the first aspect or the implementations of the first aspect, the first bypass switch is configured to selectively bypass the power attenuator based on whether a strength of the second signal is greater than a third threshold; the second bypass switch is configured to selectively bypass the first LNA based on whether the strength of the second signal is greater than a fourth threshold; and the third threshold is greater than the fourth threshold. In this way, based on the strength of the second signal, the first LNA is selectively bypassed, and the power amplifier is selectively bypassed, to control the gain amplitude of the second signal input into the second baseband processor, and the gain level of the first LNA does not need to be adjusted.

According to any one of the first aspect or the implementations of the first aspect, a second LNA is disposed between the first LNA and the antenna; and the first LNA is integrated with the first RF receive channel, the first baseband processor, the second RF receive channel, and the second baseband processor.

According to any one of the first aspect or the implementations of the first aspect, the second baseband processor is configured to control an off/on state of the first bypass switch.

According to any one of the first aspect or the implementations of the first aspect, the first baseband processor is configured to control a gain level of the first LNA.

According to any one of the first aspect or the implementations of the first aspect, the first RF receive channel comprises at least one of the following elements: an internal LNA, a mixer, and a receive analog baseband (RX ABB).

According to any one of the first aspect or the implementations of the first aspect, the second RF receive channel comprises at least one of the following elements: an internal LNA, a mixer, and an RX ABB.

According to a second aspect, a chip is provided, and includes: a first radio frequency (RF) receive channel, coupled to a gain unit, where the gain unit is coupled to an antenna; a first baseband processor, configured to receive a first signal from the antenna through the first radio frequency (RF) receive channel; a second RF receive channel, coupled to the gain unit; and a second baseband processor, configured to receive a second signal from the antenna through the second RF receive channel, where a first bypass switch is disposed between the second RF receive channel and the gain unit. The second baseband processor is further configured to control the first bypass switch to selectively bypass at least one gain device in the gain unit.

According to the second aspect, the gain unit includes a first low noise amplifier (LNA). An input port of the first LNA is coupled to the antenna, and an output port of the first LNA is coupled to the first RF receive channel. The first bypass switch is separately coupled to the output port of the first LNA and the input port of the first LNA; and the second baseband processor is specifically configured to selectively bypass the first LNA.

According to any one of the second aspect or the implementations of the second aspect, the second baseband processor is configured to control, based on whether a strength of the second signal is greater than a first threshold, the first bypass switch to selectively bypass the first LNA.

According to any one of the second aspect or the implementations of the second aspect, the gain unit includes a first LNA and a power attenuator. An output port of the first LNA is separately coupled to the first RF receive channel and an input port of the power attenuator, and an input port of the first LNA is coupled to the antenna. The first bypass switch is separately coupled to the input port of the power attenuator and an output port of the power attenuator; and the second baseband processor is specifically configured to control the first bypass switch to selectively bypass the power attenuator.

According to any one of the second aspect or the implementations of the second aspect, the second baseband processor is configured to control, based on whether a strength of the second signal is greater than a second threshold, the first bypass switch to selectively bypass the power attenuator.

According to any one of the second aspect or the implementations of the second aspect, a second bypass switch is disposed between the first LNA and the power attenuator, and the second bypass switch is separately coupled to the input port of the first LNA and the output port of the first LNA; the first bypass switch is separately coupled to the input port of the power attenuator and the output port of the power attenuator, and is configured to selectively bypass the power attenuator; and the second baseband processor is further configured to: control the second bypass switch to selectively bypass the first LNA, and control the first bypass switch to selectively bypass the power attenuator.

According to any one of the second aspect or the implementations of the second aspect, the second baseband processor is configured to control, based on whether a strength of the second signal is greater than a third threshold, the first bypass switch to selectively bypass the power attenuator; and the second baseband processor is configured to control, based on whether the strength of the second signal is greater than a fourth threshold, the second bypass switch to selectively bypass the first LNA. The third threshold is greater than the fourth threshold.

According to any one of the second aspect or the implementations of the second aspect, the first baseband processor is further configured to control a gain level of the first LNA.

According to any one of the second aspect or the implementations of the second aspect, the first bypass switch is integrated into the chip.

According to any one of the second aspect or the implementations of the second aspect, at least one gain device in the gain unit is integrated into the chip.

According to any one of the second aspect or the implementations of the second aspect, the first RF receive channel comprises at least one of the following elements: an internal first LNA, a mixer, and a receive analog baseband (RX ABB).

According to any one of the second aspect or the implementations of the second aspect, the second RF receive channel comprises at least one of the following elements: an internal first LNA, a mixer, and an RX ABB.

According to a third aspect, an embodiment of the present disclosure provides a control method. The method is applied to a short-range communications apparatus, and the method includes: receiving a first signal from an antenna through a first radio frequency (RF) receive channel, where the first RF receive channel is coupled to a gain unit, and the gain unit is coupled to the antenna; receiving a second signal from the antenna through a second RF receive channel, where the second RF receive channel is coupled to the gain unit, and a first bypass switch is disposed between the second RF receive channel and the gain unit; and controlling the first bypass switch to selectively bypass at least one gain device in the gain unit.

According to the third aspect, the gain unit includes a first low noise amplifier (LNA), and the controlling the first bypass switch to selectively bypass at least one gain device in the gain unit includes: controlling, based on whether a strength of the second signal is greater than a first threshold, the first bypass switch to selectively bypass the first LNA.

According to any one of the third aspect or the implementations of the third aspect, the gain unit includes a first LNA and a power attenuator, and the controlling the first bypass switch to selectively bypass at least one gain device in the gain unit includes: controlling, based on whether a strength of the second signal is greater than a second threshold, the first bypass switch to selectively bypass the power attenuator.

According to any one of the third aspect or the implementations of the third aspect, a second bypass switch is disposed between the first LNA and the power attenuator, and the controlling the first bypass switch to selectively bypass at least one gain device in the gain unit includes: controlling, based on whether the strength of the second signal is greater than a third threshold, the first bypass switch to selectively bypass the power attenuator; and controlling, based on whether the strength of the second signal is greater than a fourth threshold, the second bypass switch to selectively bypass the first LNA, where the third threshold is greater than the fourth threshold.

According to any one of the third aspect or the implementations of the third aspect, the method further includes: controlling a gain level of the first LNA based on a strength of the first signal.

DESCRIPTION OF EMBODIMENTS

The following clearly describes the technical solutions in embodiments of the present disclosure with reference to accompanying drawings in embodiments of the present disclosure. Apparently, the described embodiments are some rather than all of embodiments. All other embodiments obtained by a person of ordinary skill in the art based on embodiments of the present disclosure without creative efforts shall fall within the protection scope of the present disclosure.

The term "and/or" in this specification describes only an association relationship for describing associated objects and represents that one of three relationships may exist. For example, A and/or B may represent one of the following three cases: Only A exists, both A and B exist, and only B exists.

In the specification and claims of embodiments of the present disclosure, the terms such as "first" and "second" are intended to distinguish between different objects but do not indicate a particular order of the objects. For example, a first target object, a second target object, and the like are used to distinguish between different target objects, but do not indicate a particular order of the objects.

In embodiments of the present disclosure, the word such as "example" or "for example" is used to represent giving an example, an illustration, or a description. Any embodiment or design solution described as an "example" or "for example" in embodiments of the present disclosure should not be explained as being more preferred or having more advantages than another embodiment or design solution. Exactly, use of the word "example", "for example", or the like is intended to present a related concept in a specific manner.

In descriptions of embodiments of the present disclosure, unless otherwise specified, "a plurality of" means two or more. For example, a plurality of processing units are two or more processing units, and a plurality of systems are two or more systems.

Figure 1:
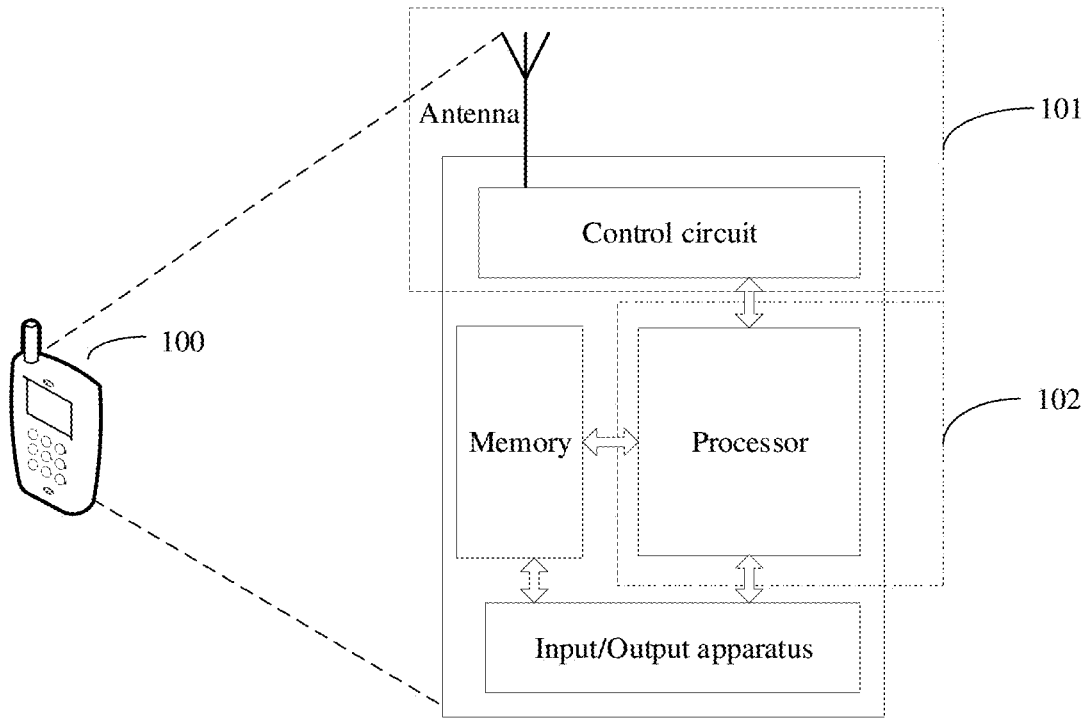
FIG. 1 is an example schematic diagram of a structure of a terminal device.

FIG. 1 is a diagram of a structure of a terminal device having a single antenna. In an actual scenario, the terminal device may alternatively have a plurality of antennas, and may be a device having at least two antennas. For ease of description, FIG. 1 shows only a main component of a terminal device. As shown in FIG. 1, a terminal device 100 includes a processor, a memory, a control circuit, an antenna, and an input/output apparatus. The processor is mainly configured to: process a communications protocol and communication data, control the entire terminal device, execute a software program, and process data of the software program. For example, the processor is configured to support an action of the terminal device in this embodiment. The memory is mainly configured to store the software program and the data, for example, store a correspondence between a threshold and a radio frequency (RF) channel in this embodiment. The control circuit is mainly configured to: perform conversion between a baseband signal and a radio frequency signal, and process a radio frequency signal. The control circuit and the antenna may also be referred to as a transceiver together, and the transceiver is mainly configured to send and receive a radio frequency signal in a form of an electromagnetic wave. The input/output apparatus, for example, a touchscreen, a display, or a keyboard, is mainly configured to: receive data entered by a user, and output data to the user.

When the terminal device is powered on, the processor may read the software program in the memory, interpret and execute instructions of the software program, and process data of the software program. When data needs to be transmitted in a wireless manner, the processor performs baseband processing on the to-be-transmitted data, and then outputs a baseband signal to a radio frequency circuit, and the radio frequency circuit performs radio frequency processing on the baseband signal, and then transmits a radio frequency signal to an outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data and processes the data.

A person skilled in the art may understand that, for ease of description, FIG. 1 shows merely one memory and one processor. An actual terminal device may include a plurality of processors and a plurality of memories. The memory may also be referred to as a storage medium, a storage device, or the like. This is not limited in this embodiment.

In an optional implementation, the processor may include a baseband processor and/or a central processing unit, the baseband processor is mainly configured to process a communications protocol and communication data, and the central processing unit is mainly configured to control the entire terminal device, execute a software program, and process data of the software program. The processor in FIG. 1 may integrate functions of the baseband processor and the central processing unit. A person skilled in the art may understand that the baseband processor and the central processing unit may be processors independent of each other, and are interconnected through a bus, or the like. A person skilled in the art may understand that the terminal device may include a plurality of baseband processors, to adapt to different network standards, the terminal device may include a plurality of central processing units, to enhance a processing capability of the terminal device, and various components of the terminal device may be connected through various buses. The baseband processor may also be referred to as a baseband processing circuit or a baseband processing chip. The central processing unit may also be referred to as a central processing circuit or a central processing chip. A function of processing the communications protocol and the communication data may be embedded into the processor, or may be stored in the memory in a form of a software program, and the processor performs software program to implement a baseband processing function.

In this embodiment, an antenna having a transceiver function and the control circuit may be considered as a transceiver unit 101 of the terminal device 100, for example, are configured to support the terminal device to perform a receiving function and a transmitting function. A processor having a processing function is considered as a processing unit 102 of the terminal device 100. As shown in FIG. 1, the terminal device 100 includes the transceiver unit 101 and the processing unit 102. The transceiver unit may also be referred to as a transceiver, a transceiver machine, a transceiver apparatus, or the like. Optionally, a device configured to implement the receiving function in the transceiver unit 101 may be considered as a receiving unit, and a device configured to implement the sending function in the transceiver unit 101 may be considered as a sending unit. In other words, the transceiver unit 101 includes the receiving unit and the sending unit. The receiving unit may also be referred to as a receiver machine, an input port, a receiving circuit, or the like, and the sending unit may be referred to as a transmitter machine, a transmitter, a transmit circuit, or the like.

The processing unit 102 may be configured to execute instructions stored in the memory, to control the transceiver unit 101 to receive a signal and/or send a signal, to complete a function of the terminal device in this embodiment. In an implementation, a function of the transceiver unit 101 may be considered to be implemented by using a transceiver circuit or a dedicated transceiver chip.

In descriptions in this embodiment, the terminal device is a terminal product supporting an 802.11 series standard and a bluetooth standard, and the terminal device may be a wireless communications chip, a wireless sensor, a wireless communications terminal, or the like, or may be referred to as a user, a station, or a terminal. For example, the station may be a mobile phone supporting a Wi-Fi communication function and a bluetooth communication function, a tablet computer supporting a Wi-Fi communication function and a bluetooth communication function, a set-top box supporting a Wi-Fi communication function and a bluetooth communication function, a smart television supporting a Wi-Fi communication function and a bluetooth communication function, a smart wearable device supporting a Wi-Fi communication function and a bluetooth communication function, a vehicle-mounted communications device supporting a Wi-Fi communication function and a bluetooth communication function, or a computer supporting a Wi-Fi communication function and a bluetooth communication function. Optionally, an 802.11 series includes but is not limited to at least one of a plurality of WLAN standards in an 802.11 family such as 802.11be, 802.11ax, 802.11ac, 802.11n, 802.11 g, 802.11b, and 802.11a.

A wireless local area network (WLAN) (for example, a Wi-Fi network) may provide high-speed and low-latency transmission. As a WLAN application scenario continuously evolves, a WLAN system is applied to more scenarios or industries, for example, is applied to an internet of things industry, is applied to an internet of things industry or a banking industry, or is applied to an enterprise office, a stadium and an exhibition hall, a concert hall, a hotel room, a dormitory, a ward, a classroom, a supermarket, a square, a street, a generation workshop, or a warehouse. Certainly, a device (for example, an access point or a station) supporting WLAN communication may be a sensor node (for example, smart water meter, a smart meter, or a smart air detection node) in smart city, a smart device (for example, a smart camera, a projector, a display, a television, a speaker, a refrigerator, or a washing machine) in smart home, a node in an internet of things, an entertainment terminal (for example, a wearable device such as an AR device or a VR device), a smart device (for example, a printer, a projector, a loudspeaker, or a speaker) in smart office, an internet of vehicles device in the internet of vehicles, and infrastructure (for example, a vending machine, a self-service navigation station in a supermarket, a self-service cash collection device, or a self-service ordering machine) in a daily life scenario, a large-scale stadium, a music venue, or the like. A specific form of the terminal device is not particularly limited in this embodiment, and is merely described as an example herein.

Bluetooth (BT) is a wireless communications technology standard, and enables a mobile device to exchange data within a short distance, to form a personal area network. A shortwave ultrahigh frequency radio wave is used for bluetooth to perform communication on an ISM (industrial, scientific, and medical) band from 2.4 GHz to 2.485 GHz. A communication distance ranges from several meters to several hundred meters.

In a scenario in which a bluetooth function and a Wi-Fi function coexist, a structure in which a bluetooth module and a Wi-Fi module share an antenna and an LNA is usually used, to reduce costs and reduce a circuit layout area. For example, a shared LNA may include a shared external LNA, a shared internal LNA, or the shared external LNA and the shared internal LNA. There may be one or more shared LNAs.

Figure 2:
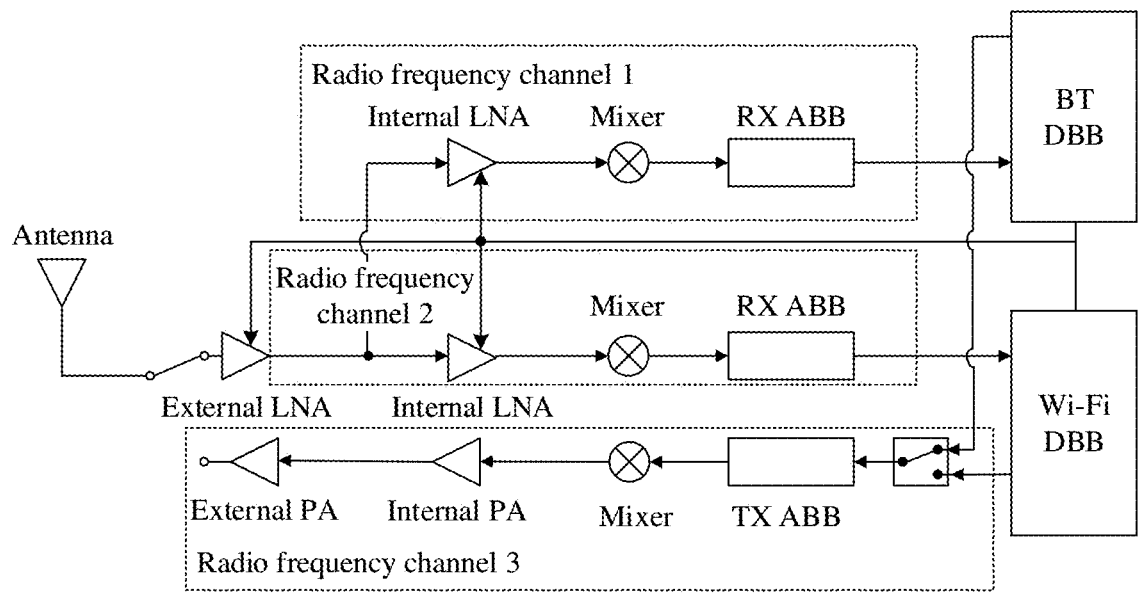
FIG. 2 is an example schematic diagram of a structure of a short-range communications apparatus.

FIG. 2 is an example schematic diagram of a circuit structure. Refer to FIG. 2. For example, a BT DBB (digital baseband) and a Wi-Fi DBB share an external LNA and an antenna. A terminal device may receive a Wi-Fi signal and a bluetooth signal through an antenna, and obtain two signals (the bluetooth signal and the Wi-Fi signal) through division after the external LNA. The bluetooth signal is transmitted to the BT DBB through a radio frequency channel 1, and the Wi-Fi signal is transmitted to the Wi-Fi DBB through a radio frequency channel 2.

For example, devices on the radio frequency channel 1 include but are not limited to devices such as an internal LNA, a mixer, and an RX ABB (receive analog baseband), and devices such as an internal LNA, a mixer, and an RX ABB are disposed on the radio frequency channel 2. Optionally, the BT DBB and Wi-Fi DBB are respectively electrically connected to the internal LNA and the external LNA, for example, through a control line, to transmit a control signal (or an indication signal).

Still refer to FIG. 2. The circuit further includes a radio frequency channel 3, the BT DBB and the Wi-Fi DBB are coupled to the radio frequency channel 3, the radio frequency channel 3 is coupled to the antenna, and the BT DBB and the Wi-Fi DBB transmit the bluetooth signal or the Wi-Fi signal to the antenna through the radio frequency channel 3, and the antenna transmits the bluetooth signal or the Wi-Fi signal. Devices such as a TX ABB (transmit analog baseband), a single-pole double-throw switch, a mixer, an internal PA, and an external PA are disposed on the radio frequency channel 3. It should be noted that the radio frequency channel described in the present disclosure may also be referred to as a circuit, a processing circuit, a transmission circuit, or the like. This is not limited in the present disclosure. Descriptions are not repeated below.

Refer to FIG. 2. For example, an arbitration mechanism is used for the terminal device, and may also be referred to as a priority mechanism. A principle of the arbitration mechanism is that in a scenario in which the bluetooth signal and the Wi-Fi signal coexist, in other words, both the BT DBB and the Wi-Fi DBB are enabled, because the BT DBB and the Wi-Fi DBB share an LNA, whether the BT DBB or the Wi-Fi DBB controls a gain level of the shared LNA, or obtains control permission over the shared LNA, needs to be determined. Optionally, a module (the BT DBB or the Wi-Fi DBB) with a high priority may obtain control permission over the shared LNA (for example, the external LNA). The priority is determined by a processor and delivered to the BT DBB and the Wi-Fi DBB.

For example, refer to FIG. 2. If a priority of the BT DBB is higher than a priority of the Wi-Fi DBB, the BT DBB obtains control permission over the external LNA. When the BT DBB detects that a signal strength of the bluetooth signal is higher than a switching threshold of bluetooth (which may also be referred to as a switching threshold of the BT DBB), the BT DBB sends a control signal to the external LNA through the control line, to control the level of the external LNA to decrease, in other words, to set the external LNA to a low gain level. If a priority of the Wi-Fi DBB is higher than a priority of the BT DBB, the Wi-Fi DBB obtains control permission over the external LNA. When the Wi-Fi DBB detects that a signal strength of the Wi-Fi signal is higher than a switching threshold of Wi-Fi (which may also be referred to as a switching threshold of the Wi-Fi DBB), the Wi-Fi DBB sends a control signal to the external LNA through the control line, to control a level of the external LNA to decrease, in other words, to set the external LNA to a low gain level. It should be noted that the low gain level in this embodiment is a level to which a gain in a current processed signal is reduced. For example, the external LNA is configured to increase the gain in the signal. A gain in a signal passing through the external LNA is greater than a gain in a signal received by the antenna. When the external LNA is set to the low gain level, the gain in the signal passing through the external LNA is reduced. In an example, the reduced gain in the signal is still greater than the gain in the signal received by the antenna. In another example, the reduced gain in the signal is less than or equal to the gain in the signal received by the antenna. This is not limited in the present disclosure. A high gain level indicates to increase the gain in the signal passing through the external LNA. Details are not be described below.

Figure 3:
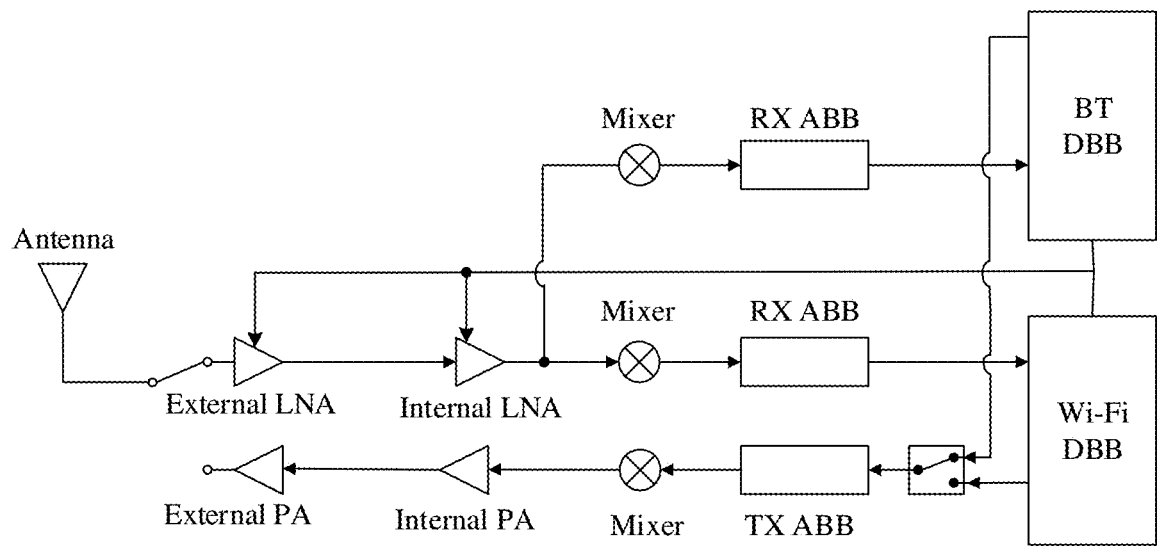
FIG. 3 is an example schematic diagram of a structure of a short-range communications apparatus.

FIG. 3 is an example schematic diagram of a circuit structure. Refer to FIG. 3. A BT DBB and a Wi-Fi DBB share an antenna, an external LNA, and an internal LNA, and a priority mechanism may still be configured to control the shared external LNA and the shared internal LNA. Specific details are similar to that of descriptions in FIG. 2.

It should be noted that, because the BT DBB has a low requirement for a signal-to-noise ratio of a bluetooth signal and has a high requirement for an anti-interference capability, a switching threshold of the BT DBB is low, for example, −70 dBm. However, because Wi-Fi has a high requirement for a signal-to-noise ratio, a switching threshold of the Wi-Fi DBB is high, for example, −50 dBm. When the BT DBB controls the external LNA, the BT DBB controls, at a low signal strength (for example, −70 dBm), a level of the external LNA to decrease, so that a signal-to-noise ratio of a Wi-Fi signal is reduced, a demodulation capability of the Wi-Fi DBB is greatly reduced, and a throughput is reduced. When the Wi-Fi DBB controls the external LNA, the Wi-Fi DBB may control, at a high signal strength (for example, −50 dBm), a level of the external LNA to decrease, so that an anti-interference capability of the BT DBB is reduced.

For example, the external LNA may include a high level and a low level, the high level is enabled, and the low level is disabled. The external LNA may alternatively include a plurality of different levels, for example, include a plurality of different high levels, to increase a gain in a signal to different degrees, and/or include a plurality of different low levels, to decrease a gain in a signal to different degrees. The internal LNA is similar.

The present disclosure provides a short-range communications apparatus. For example, the apparatus may be a terminal, a short-range communications chip in the terminal, or a chip group including the short-range communications chip and an off-chip device. Specifically, in the present disclosure, an additional control circuit is disposed on a radio frequency channel between an antenna and a BT DBB, so that both the BT DBB and a Wi-Fi DBB can implement control of a gain in a signal. In other words, an anti-interference requirement of bluetooth is met, and a signal-to-noise ratio requirement of Wi-Fi is met.

Figure 4:
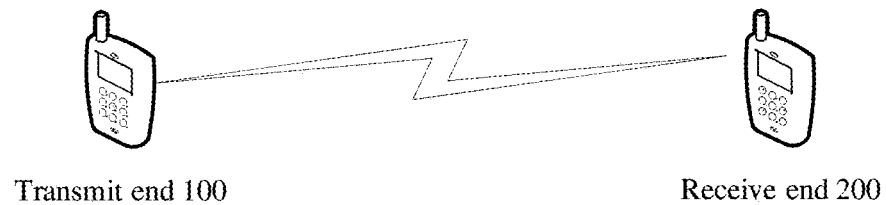
FIG. 4 is a schematic diagram of a communications system according to an embodiment of the present disclosure.

FIG. 4 is a schematic diagram of a communications system according to an embodiment of the present disclosure. The communications system includes one or more transmit ends 100 and one or more receive ends 200. The one or more transmit ends and the one or more receive ends in this embodiment each may include various electronic devices having a wireless communication function. The electronic device may be a handheld device, a vehicle-mounted device, a wearable device (for example, a smartwatch, a smartband, a wireless headset, an augmented reality device, a virtual reality device, or smart glasses), a computing device, another processing device connected to a wireless modem, user equipment (UE) in various forms, a mobile station (MS), a smart home device (for example, a smart refrigerator, a smart television, or a smart router), and the like.

In an example, when any electronic device A in the foregoing sends data to any electronic device B in the foregoing, the electronic device A is a sending device, and the electronic device B is a receiving device. In another example, when any electronic device A in the foregoing receives data sent by any electronic device B in the foregoing, the electronic device A is a receiving device, and the electronic device B is a sending device.

Optionally, in this embodiment, the transmit end 100 may send a bluetooth signal and/or a Wi-Fi signal to the receive end 200.

In embodiments of the present disclosure, although descriptions are mainly provided by using, as an example, a network in which Wi-Fi and bluetooth are deployed, a person skilled in the art easily understands that various aspects of the present disclosure may be extended to use of a terminal device in a case in which any two or more network functions in another network in which various standards or protocols are used coexist. For example, the another network in which various standards or protocols are used may be a high performance radio LAN (HIPERLAN) (which is a wireless standard similar to an IEEE 802.11 standard, and is mainly used in Europe), a wide area network (WAN), a wireless local area network (WLAN), a personal area network (PAN), or another network that is known currently or that is developed in the future. Therefore, the various aspects provided in the present disclosure may be applicable to any proper short-range wireless communications network regardless of a used coverage area and a used wireless access protocol.

With reference to the schematic diagram of the communications system shown in FIG. 4, the following describes specific implementation solutions of the present disclosure.

Scenario 1

Figure 5:
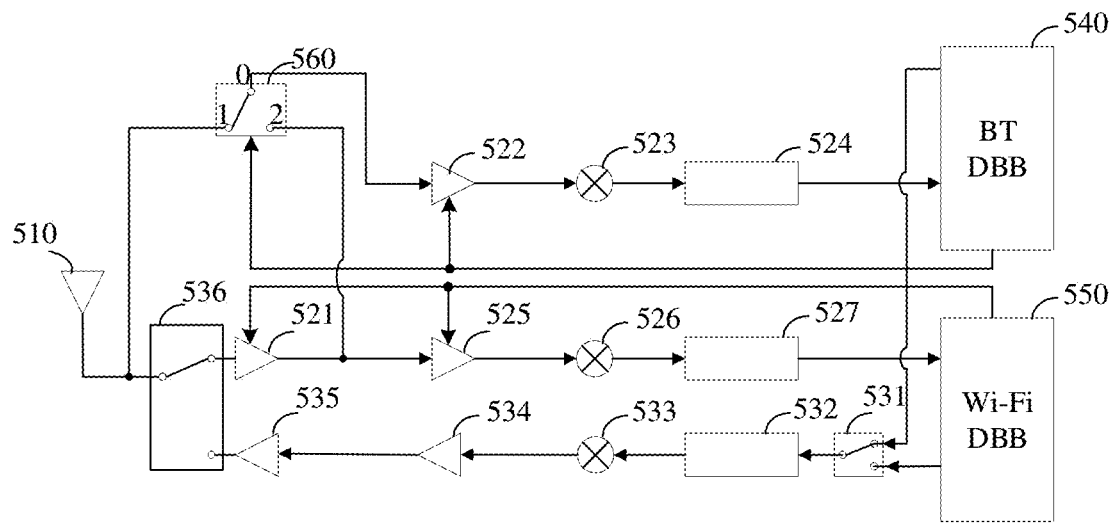
FIG. 5 is a schematic diagram of a structure of a short-range communications apparatus according to an embodiment of the present disclosure.

FIG. 5 is a schematic diagram of a structure of a short-range communications apparatus according to an embodiment of the present disclosure. Refer to FIG. 5. A BT DBB 540 and a Wi-Fi DBB 550 each are coupled to an antenna 510 through a radio frequency receive channel and a radio frequency transmit channel, the BT DBB 540 receives, through the radio frequency receive channel, a bluetooth signal input from the antenna 510, the Wi-Fi DBB 550 receives, through the radio frequency receive channel, a Wi-Fi signal input from the antenna 510, and the BT DBB 540 and the Wi-Fi DBB 550 may separately output a bluetooth signal and a Wi-Fi signal to the antenna 510 through the radio frequency transmit channel.

For example, in this embodiment, the BT DBB 540 is coupled to the antenna 510 through a radio frequency channel 1 or a radio frequency channel 2. Devices such as an external LNA 521, an internal LNA 522, a mixer 523, and an RX ABB 524 are disposed on the radio frequency channel 1, and devices such as the internal LNA 522, the mixer 523, and the RX ABB 524 are disposed on the radio frequency channel 2. For example, a single-pole double-throw switch 560 exists between the radio frequency channel 1 and the radio frequency channel 2, and includes a terminal 0, a terminal 1, and a terminal 2. The terminal 0 is a non-movable end, and the terminal 1 and the terminal 2 are movable ends.

The single-pole double-throw switch 560 is configured to control an enabling state of the radio frequency channel 1 and the radio frequency channel 2. To be specific, the single-pole double-throw switch 560 is configured to control a switch between the radio frequency channel 1 and the radio frequency channel 2, so that the BT DBB 540 can be coupled to the antenna 510 through the radio frequency channel 1 or the radio frequency channel 2. Refer to FIG. 5. The terminal 0 of the single-pole double-throw switch 560 is coupled to the BT DBB 540, the terminal 1 is coupled to an input port of the external LNA 521, and the terminal 2 is coupled to an output port of the external LNA 521.

Optionally, in this embodiment, the external LNA may also be referred to as a shared external LNA, or may be referred to as a gain unit. It should be noted that names and a quantity of devices on each radio frequency channel are merely illustrative examples. This is not limited in the present disclosure.

In an example, if the single-pole double-throw switch 560 is thrown to the terminal 1, in other words, the terminal 0 is connected to the terminal 1, the radio frequency channel 2 is enabled. In other words, the antenna 510 transmits a bluetooth signal to the BT DBB through the radio frequency channel 2. In another example, if the single-pole double-throw switch 560 is thrown to the terminal 2, in other words, the terminal 0 is connected to the terminal 2, the radio frequency channel 1 is enabled. In other words, the antenna 510 transmits a bluetooth signal to the BT DBB 540 through the radio frequency channel 1. It can also be understood that, after the single-pole double-throw switch 560 is thrown to the terminal 1, the external LNA (namely, the gain unit) is bypassed or set aside.

Still refer to FIG. 5. The Wi-Fi DBB 550 is coupled to the antenna 510 through a radio frequency channel 3. For example, devices such as the external LNA 521, an internal LNA 525, a mixer 526, and an RX ABB 527 are disposed on the radio frequency channel 3. The antenna 510 may transmit a Wi-Fi signal to the Wi-Fi DBB 550 through the radio frequency channel 3.

Still refer to FIG. 5. The BT DBB 540 and the Wi-Fi DBB 550 are coupled to the antenna 510 through the radio frequency transmit channel. Devices such as a switch (which may be a single-pole double-throw switch) 531, a TX ABB 532, a mixer 533, an internal PA (power amplifier) 534, and an external PA 535 are disposed on the radio frequency transmit channel. It should be noted that a radio frequency transmit channel shown in accompanying drawings (including FIG. 5, FIG. 7, FIG. 9, FIG. 11, and FIG. 13) of the present disclosure is merely a schematic example. A device, a quantity of devices, a channel, and the like included on the radio frequency transmit channel may not be limited to a structure defined in descriptions in the present disclosure.

The radio frequency receive channel (including the radio frequency channel 1, the radio frequency channel 2, and the radio frequency channel 3) and the radio frequency transmit channel each are a data transmission radio frequency channel, and are configured to transmit corresponding data. In this embodiment, the BT DBB may be further connected to the single-pole double-throw switch 560 and the internal LNA 522 through a control channel, and the Wi-Fi DBB may be further connected to the external LNA 521 and the internal LNA 525 through a control channel, in other words, an electrical connection is performed through a control line, to transmit a control signal or an indication signal. In descriptions in this embodiment, the control signal is used to control an off/on state of each switch, and the indication signal is used to control a gain level of an LNA. The indication signal may alternatively be a related instruction sent by a processor. Descriptions are not repeated below.

Refer to FIG. 5. Optionally, the BT DBB 540 may send a control signal (namely, an electrical signal) to the single-pole double-throw switch 560 through a control channel connected to the single-pole double-throw switch 560, to control an off/on state of the single-pole double-throw switch 560. Optionally, the BT DBB 540 may alternatively send an indication signal to the internal LNA 522 through a control channel connected to the internal LNA 522, to control a gain level of the internal LNA 522.

Still refer to FIG. 5. Optionally, the Wi-Fi DBB 550 may send an indication signal (namely, an electrical signal) to the external LNA 521 and/or the internal LNA 525 through a control channel connected between the external LNA 521 and the internal LNA 525, to control a level switch of the external LNA 521 and/or the internal LNA 525. For example, the external LNA 521 may include two or more levels. In this embodiment and the following embodiments, descriptions are provided by merely using a high gain level (namely, ON) and a low gain level (namely, OFF) as examples.

Optionally, a switch 536 is disposed between the antenna 510 and the external LNA 521 and the external PA 535. For example, the switch 536 is a single-pole double-throw switch, including a terminal 0, a terminal 1, and a terminal 2. The single-pole double-throw switch 536 is thrown to the terminal 1 or the terminal 2, so that the radio frequency receive channel or the radio frequency transmit channel is enabled, to input or output a signal. Optionally, if the terminal device has a plurality of antennas, the external PA 535 may be coupled to the external LNA 521 and different antennas.

Figure 6:
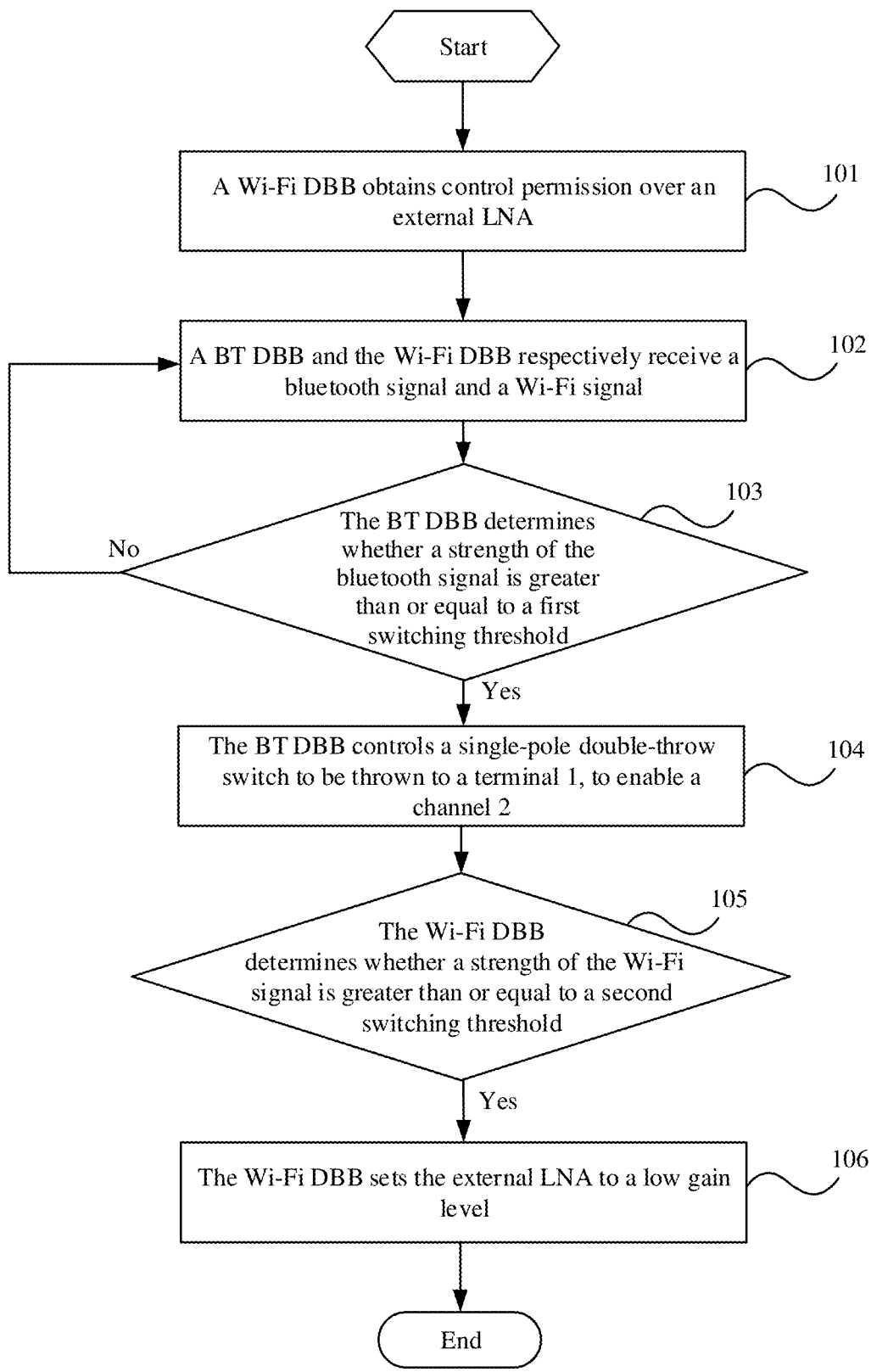
FIG. 6 is a schematic flowchart of a control method according to an embodiment of the present disclosure.

The following describes in detail a control method in an embodiment of the present disclosure with reference to FIG. 5. FIG. 6 is a schematic flowchart of a control method. In FIG. 6, there are the following steps.

Step 101: A Wi-Fi DBB obtains control permission over an external LNA.

Specifically, a processor may send indication information to a Wi-Fi DBB 550, to indicate the Wi-Fi DBB 550 to obtain control permission over an external LNA 521. In response to the received indication information, the Wi-Fi DBB 550 determines that the Wi-Fi DBB 550 has control permission over the external LNA 521. Optionally, the indication information may include priority information. For example, a high priority indicates that the Wi-Fi DBB 550 has control permission, and a low priority indicates that the Wi-Fi DBB 550 does not have control permission. Optionally, the processor may alternatively send indication information to a BT DBB. The indication information includes a low priority. In other words, the indication information indicates that the BT DBB does not have control permission over the external LNA 521. Optionally, the BT DBB may alternatively be pre-configured to have no control permission. In other words, the processor does not need to separately deliver the indication information to the BT DBB.

For example, in an initial stage, it is considered by default that a gain level of the external LNA 521 is set to a high gain level, in other words, is in an on state.

Step 102: The BT DBB and the Wi-Fi DBB respectively receive a bluetooth signal and a Wi-Fi signal.

For example, in the initial phase, it is considered by default that a single-pole double-throw switch 560 is thrown to a terminal 2, in other words, a radio frequency channel 1 is enabled. An antenna transmits a received bluetooth signal to a BT DBB 540 through the radio frequency channel 1.

For example, the antenna transmits a received Wi-Fi signal to the Wi-Fi DBB 550 through a radio frequency channel 3.

It should be noted that, in this embodiment, only a scenario in which the bluetooth signal and the Wi-Fi signal coexist is used as an example for description. In another embodiment, if only the bluetooth signal or the Wi-Fi signal exists, a manner in an embodiment of an existing technology may be used. This is not limited in the present disclosure.

Step 103: The BT DBB determines whether a strength of the bluetooth signal is greater than or equal to a first switching threshold.

For example, in this embodiment, that the first switching threshold is −70 dBm is used as an example for description. Specifically, the BT DBB 540 determines, based on the received bluetooth signal, whether the strength of the bluetooth signal is greater than or equal to the first switching threshold. In an example, if the strength of the bluetooth signal is greater than or equal to the first switching threshold, step 104 is performed, and if the strength of the bluetooth signal is less than the first switching threshold, step 102 is performed repeatedly. In other words, the bluetooth signal continues to be received through the radio frequency channel 1. It should be noted that, in descriptions in this embodiment, a signal strength (including the strength of the bluetooth signal and a strength of the Wi-Fi signal) is a strength of a signal received by the antenna. In another embodiment, the signal strength may alternatively be a strength of a signal received by the BT DBB or the Wi-Fi DBB. A corresponding switching threshold may be set based on an actual situation. This is not limited in the present disclosure. Descriptions are not repeated below.

Step 104: The BT DBB controls the single-pole double-throw switch to be thrown to a terminal 1, to enable a radio frequency channel 2.

For example, if the BT DBB 540 determines that the strength of the bluetooth signal is greater than or equal to −70 dBm, the BT DBB 540 sends a control signal to the single-pole double-throw switch 560 through a control channel between the BT DBB 540 and the single-pole double-throw switch 560, to control the single-pole double-throw switch 560 to be thrown to the terminal 1 to enable the radio frequency channel 2. The BT DBB 540 receives, through the radio frequency channel 2, the bluetooth signal transmitted by the antenna 510, to skip the external LNA (in other words, bypass the external LNA), thereby reducing a gain in the bluetooth signal.

It should be noted that, in this case, the Wi-Fi DBB 550 still has control permission over the external LNA, and the external LNA is still at a high gain level. In other words, the BT DBB skips the external LNA (in other words, bypasses the external LNA), to reduce the gain in the bluetooth signal. In this case, the Wi-Fi signal is still transmitted to the Wi-Fi DBB after being processed by the external LNA, to ensure a signal-to-noise ratio of the Wi-Fi signal when an anti-interference requirement of the BT DBB is met.

Step 105: The Wi-Fi DBB determines whether a strength of the Wi-Fi signal is greater than or equal to a second switching threshold.

For example, in this embodiment, that the second switching threshold is −50 dBm is used as an example for description. Specifically, the Wi-Fi DBB 550 determines, based on the received Wi-Fi signal, whether the strength of the Wi-Fi signal is greater than or equal to the second switching threshold. In an example, if the strength of the Wi-Fi signal is greater than or equal to the second switching threshold, step 106 is performed, and if the strength of the Wi-Fi signal is less than the second switching threshold, processing is not performed. In other words, the Wi-Fi signal continues to be received through a current radio frequency channel (in other words, through a radio frequency channel of the external LNA at the high gain level).

Step 106: The Wi-Fi DBB sets the external LNA to a low gain level.

Specifically, if the Wi-Fi DBB 550 determines that the strength of the Wi-Fi signal is greater than or equal to −50 dBm, the Wi-Fi DBB 550 sends an indication signal to the external LNA 521 through a control channel between the Wi-Fi DBB 550 and the external LNA 521, to set the external LNA 521 to a low gain level, in other words, set the external LNA 521 to an off state.

In this case, the BT DBB 540 may receive the bluetooth signal through the radio frequency channel 2, and the Wi-Fi DBB 550 may receive the Wi-Fi signal through the radio frequency channel 3 including the external LNA 521 set to the low gain level.

Optionally, the BT DBB 540 and the Wi-Fi DBB 550 may alternatively transmit the bluetooth signal or the Wi-Fi signal to the antenna through a radio frequency transmit channel. For specific details, refer to an embodiment of an existing technology.

Scenario 2

Figure 7:
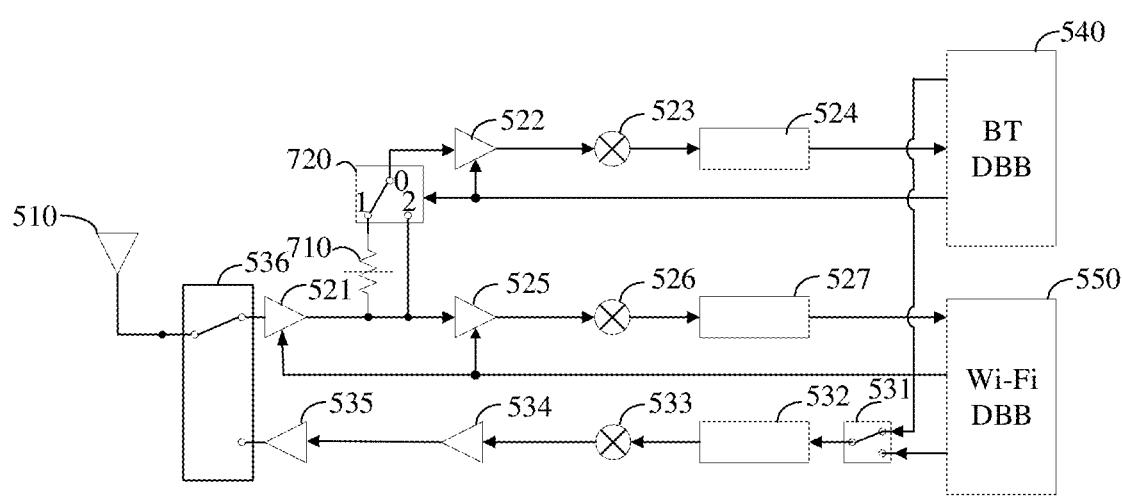
FIG. 7 is a schematic diagram of a structure of a short-range communications apparatus according to an embodiment of the present disclosure.

FIG. 7 is a schematic diagram of a structure of a short-range communications apparatus according to an embodiment of the present disclosure. Refer to FIG. 7. A BT DBB 540 and a Wi-Fi DBB 550 each are coupled to an antenna 510 through a radio frequency receive channel and a radio frequency transmit channel, the BT DBB 540 receives, through the radio frequency receive channel, a bluetooth signal input from the antenna 510, the Wi-Fi DBB 550 receives, through the radio frequency receive channel, a Wi-Fi signal input from the antenna 510, and the BT DBB 540 and the Wi-Fi DBB 550 may separately output a bluetooth signal and a Wi-Fi signal to the antenna 510 through the radio frequency transmit channel.

For example, in this embodiment, the BT DBB 540 is coupled to the antenna 510 through the radio frequency receive channel (including a radio frequency channel 1 or a radio frequency channel 2). Devices such as an external LNA 521, an internal LNA 522, a mixer 523, and an RX ABB 524 are disposed on the radio frequency channel 1, and devices such as the external LNA 521, a power attenuator 710, the internal LNA 522, the mixer 523, and the RX ABB 524 are disposed on the radio frequency channel 2. An input port of the external LNA 521 is coupled to the antenna 510, and an input port of the power attenuator 710 is coupled to the external LNA 521. For example, a single-pole double-throw switch 720 exists between the radio frequency channel 1 and the radio frequency channel 2, and includes a terminal 0, a terminal 1, and a terminal 2. The terminal 0 is a non-movable end, and the terminal 1 and the terminal 2 are movable ends. The terminal 0 is coupled to the BT DBB 540, the terminal 1 is coupled to an output port of the power attenuator 710, the terminal 2 is coupled to the input port of the power attenuator 710, and the single-pole double-throw switch is configured to control an enabling state of the radio frequency channel 1 and the radio frequency channel 2. In other words, the single-pole double-throw switch 720 is configured to control a switch between the radio frequency channel 1 and the radio frequency channel 2, so that the BT DBB 540 may be coupled to the antenna 510 through the radio frequency channel 1 or the radio frequency channel 2.

Optionally, in this embodiment, the external LNA 521 and the power attenuator 710 form a gain unit. In an example, if the single-pole double-throw switch 720 is thrown to the terminal 1, in other words, the terminal 0 is connected to the terminal 1, the radio frequency channel 2 is enabled. In other words, the antenna 510 transmits a bluetooth signal to the BT DBB 540 through the radio frequency channel 2. In other words, the power attenuator 710 in the gain unit is bypassed. In another example, if the single-pole double-throw switch 720 is thrown to the terminal 2, in other words, the terminal 0 is connected to the terminal 2, the radio frequency channel 1 is enabled. In other words, the antenna 510 transmits a bluetooth signal to the BT DBB 540 through the radio frequency channel 1. It may also be understood that, after the single-pole double-throw switch 720 is thrown to the terminal 1, to enable the radio frequency channel 2, the power attenuator further processes the bluetooth signal processed by the external LNA, in other words, performs gain attenuation on a signal obtained through amplification performed by the external LNA.

Still refer to FIG. 7. The Wi-Fi DBB 550 is coupled to the antenna 510 through the radio frequency receive channel (including a radio frequency channel 3). For example, devices such as the external LNA 521, an internal LNA 525, a mixer 526, and an RX ABB 527 are disposed on the radio frequency channel 3. The antenna 510 may transmit a Wi-Fi signal to the Wi-Fi DBB 550 through the radio frequency channel 3.

The BT DBB 540 and the Wi-Fi DBB 550 are coupled to the antenna 510 through the radio frequency transmit channel.

Optionally, the BT DBB 540 is coupled to the single-pole double-throw switch 720 and the internal LNA 522 through a control channel. Optionally, the Wi-Fi DBB 550 is coupled to the external LNA 521 and the internal LNA 525 through a control channel.

It should be noted that, unless otherwise specified, for a part that is not described in detail in an apparatus structure and a method procedure part in this embodiment and the following embodiments, refer to related descriptions in FIG. 5 and FIG. 6.

Figure 8:
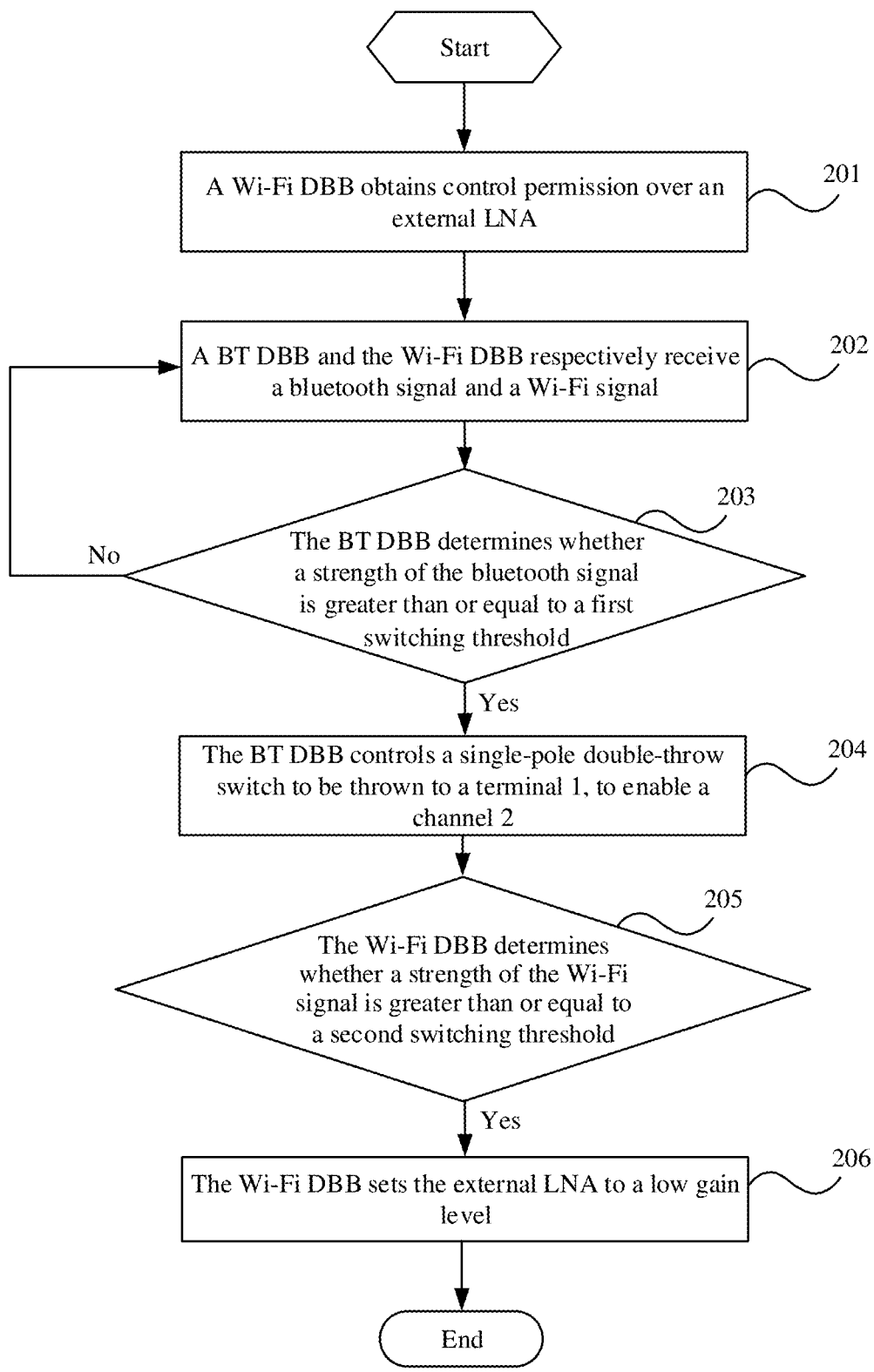
FIG. 8 is a schematic flowchart of a control method according to an embodiment of the present disclosure.

The following describes in detail a control method in an embodiment of the present disclosure with reference to FIG. 7. FIG. 8 is a schematic flowchart of a control method. In FIG. 8, there are the following steps.

Step 201: A Wi-Fi DBB obtains control permission over an external LNA.

Step 202: A BT DBB and the Wi-Fi DBB respectively receive a bluetooth signal and a Wi-Fi signal.

Step 203: The BT DBB determines whether a strength of the bluetooth signal is greater than or equal to a first switching threshold.

For example, in this embodiment, that the first switching threshold is −70 dBm is used as an example for description. Specifically, a BT DBB 540 determines, based on the received bluetooth signal, whether the strength of the bluetooth signal is greater than or equal to the first switching threshold. In an example, if the strength of the bluetooth signal is greater than or equal to the first switching threshold, step 204 is performed, and if the strength of the bluetooth signal is less than the first switching threshold, step 202 is performed repeatedly. In other words, the bluetooth signal continues to be received through a radio frequency channel 1.

Step 204: The BT DBB controls a single-pole double-throw switch to be thrown to a terminal 1, to enable a radio frequency channel 2.

For example, if the BT DBB 540 determines that the strength of the bluetooth signal is greater than or equal to −70 dBm, the BT DBB 540 sends a control signal to the single-pole double-throw switch 720 through a control channel between the BT DBB 540 and the single-pole double-throw switch 720, to control the single-pole double-throw switch 720 to be thrown to the terminal 1 to enable the radio frequency channel 2. The BT DBB 540 receives, through the radio frequency channel 2, the bluetooth signal transmitted by the antenna 510. The power attenuator 710 may process the bluetooth signal, to reduce a gain in the bluetooth signal. In other words, the gain in the bluetooth signal can be reduced by using the power attenuator. It should be noted that performance of the power attenuator may be selected based on an actual requirement. This is not limited in the present disclosure.

It should be noted that, in this case, the Wi-Fi DBB 550 still has control permission over the external LNA, and the external LNA is still at a high gain level, to ensure a signal-to-noise ratio of the Wi-Fi signal when an anti-interference requirement of the BT DBB is met.

Step 205: The Wi-Fi DBB determines whether a strength of the Wi-Fi signal is greater than or equal to a second switching threshold.

Step 206: The Wi-Fi DBB sets the external LNA to a low gain level.

Scenario 3

Figure 9:
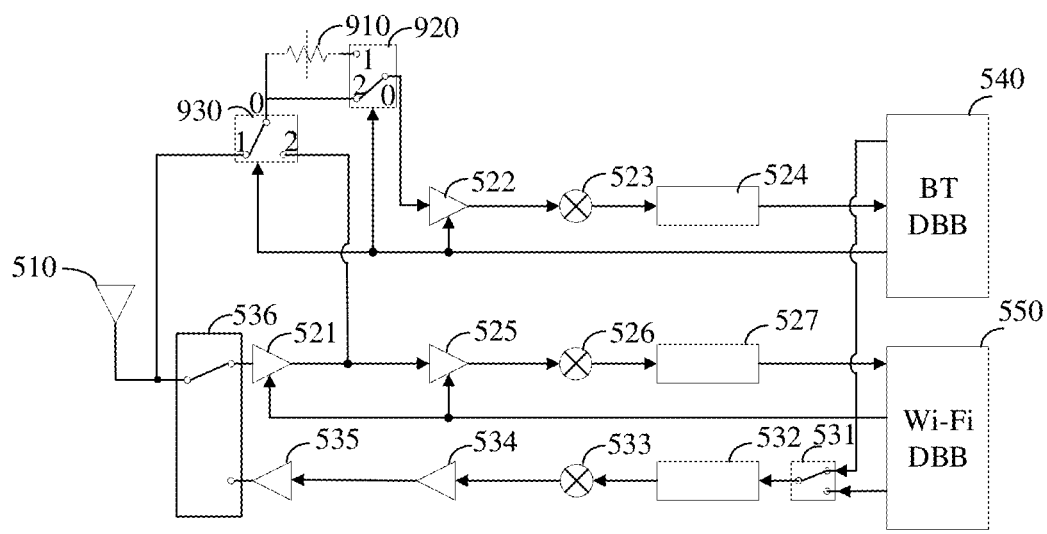
FIG. 9 is a schematic diagram of a structure of a short-range communications apparatus according to an embodiment of the present disclosure.

FIG. 9 is a schematic diagram of a structure of a short-range communications apparatus according to an embodiment of the present disclosure. Refer to FIG. 9. A BT DBB 540 and a Wi-Fi DBB 550 each are coupled to an antenna 510 through a radio frequency receive channel and a radio frequency transmit channel.

For example, in this embodiment, the BT DBB 540 is coupled to the antenna 510 through a radio frequency receive channel (including a radio frequency channel 1, a radio frequency channel 2, a radio frequency channel 3, or a radio frequency channel 4). Devices such as an external LNA 521, an internal LNA 522, a mixer 523, and an RX ABB 524 are disposed on the radio frequency channel 1, devices such as the external LNA 521, a power attenuator 910, the internal LNA 522, the mixer 523, and the RX ABB 524 are disposed on the radio frequency channel 2, devices such as the internal LNA 522, the mixer 523, and the RX ABB 524 are disposed on the radio frequency channel 3, and devices such as a power attenuator 910, the internal LNA 522, the mixer 523, and the RX ABB 524 are disposed on the radio frequency channel 4.

Continue to refer to FIG. 9. A single-pole double-throw switch is disposed between radio frequency channels, and includes a single-pole double-throw switch 920 and a single-pole double-throw switch 930. The single-pole double-throw switch 920 and the single-pole double-throw switch 930 each include a terminal 0, a terminal 1, and a terminal 2. A switch is thrown to different terminals, to implement a switch between different radio frequency channels, in other words, selectively bypass the external LNA 521 and the power attenuator 910. Refer to FIG. 9. A terminal 0 of the single-pole double-throw switch 920 is coupled to the BT DBB 540, a terminal 1 is coupled to an output port of the power attenuator 910, and a terminal 2 is coupled to an input port of the power attenuator 910. A terminal 0 of the single-pole double-throw switch 930 is coupled to the input port of the power attenuator 910, a terminal 1 is coupled to an input port of the external LNA 521, and a terminal 2 is coupled to an output port of the external LNA 521.

Optionally, in this embodiment, the external LNA 521, the power attenuator 910, and the single-pole double-throw switch 930 form a gain unit. In an example, the single-pole double-throw switch 920 is thrown to the terminal 2, and the single-pole double-throw switch 930 is thrown to the terminal 2, to enable the radio frequency channel 1, in other words, bypass the power attenuator 910 in the gain unit.

In another example, the single-pole double-throw switch 930 is thrown to the terminal 2, and the single-pole double-throw switch 920 is thrown to the terminal 1, to enable the radio frequency channel 2. In other words, the power attenuator 910 is used to implement gain attenuation.

In still another example, the single-pole double-throw switch 930 is thrown to the terminal 1, and the single-pole double-throw switch 920 is thrown to the terminal 2, to enable the radio frequency channel 3. In other words, the external LNA 521 and the power attenuator 910 in the gain unit are bypassed, to implement gain attenuation.

In yet another example, the single-pole double-throw switch 930 is thrown to the terminal 1, and the single-pole double-throw switch 920 is thrown to the terminal 1, to enable the radio frequency channel 4. In other words, the external LNA 521 in the gain unit is bypassed, and the power attenuator 910 is enabled, to implement gain attenuation.

For example, in this embodiment, in an initial stage, it is considered by default that the single-pole double-throw switch 920 and the single-pole double-throw switch 930 are thrown to the terminals 2, to enable the radio frequency channel 1. In other words, the BT DBB 540 receives, through the radio frequency channel 1, a bluetooth signal transmitted by the antenna 510.

Still refer to FIG. 9. The antenna 510 and the Wi-Fi DBB 550 are connected through a radio frequency receive channel, namely, a radio frequency channel 5. Devices such as the external LNA 521, an internal LNA 525, a mixer 526, and an RX ABB 527 are disposed on the radio frequency channel 5. The antenna 510 may transmit a Wi-Fi signal to the Wi-Fi DBB 550 through the radio frequency channel 5.

Optionally, the BT DBB 540 and the single-pole double-throw switch 920 are connected through a control channel, and the single-pole double-throw switch 930 and the internal LNA 522 are connected through a control channel. Optionally, the Wi-Fi DBB 550 is connected to the external LNA 521 and the internal LNA 525 through a control channel.

Figure 10A:
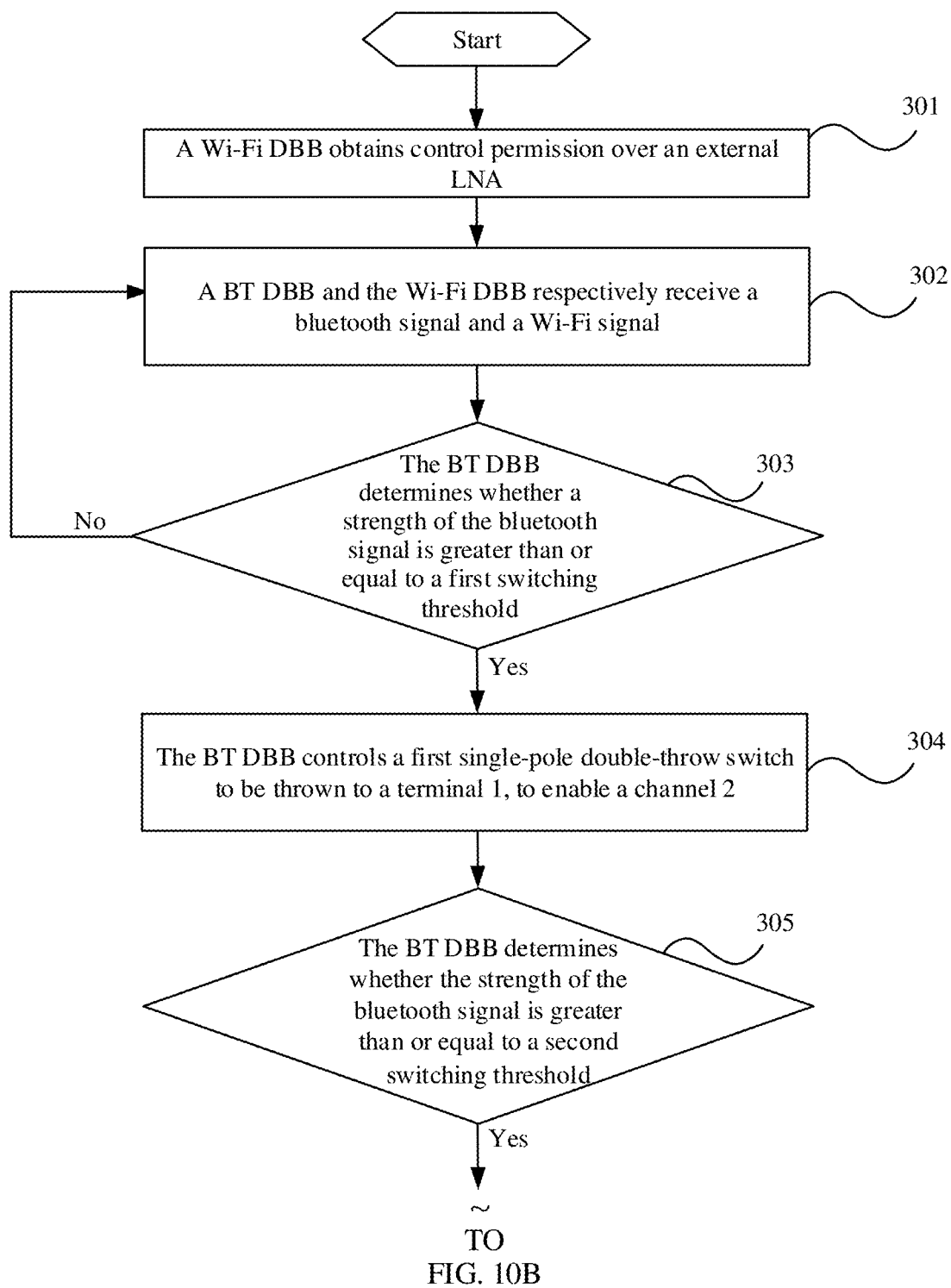
FIG. 10A and FIG. 10B are a schematic flowchart of a control method according to an embodiment of the present disclosure.
Figure 10B:
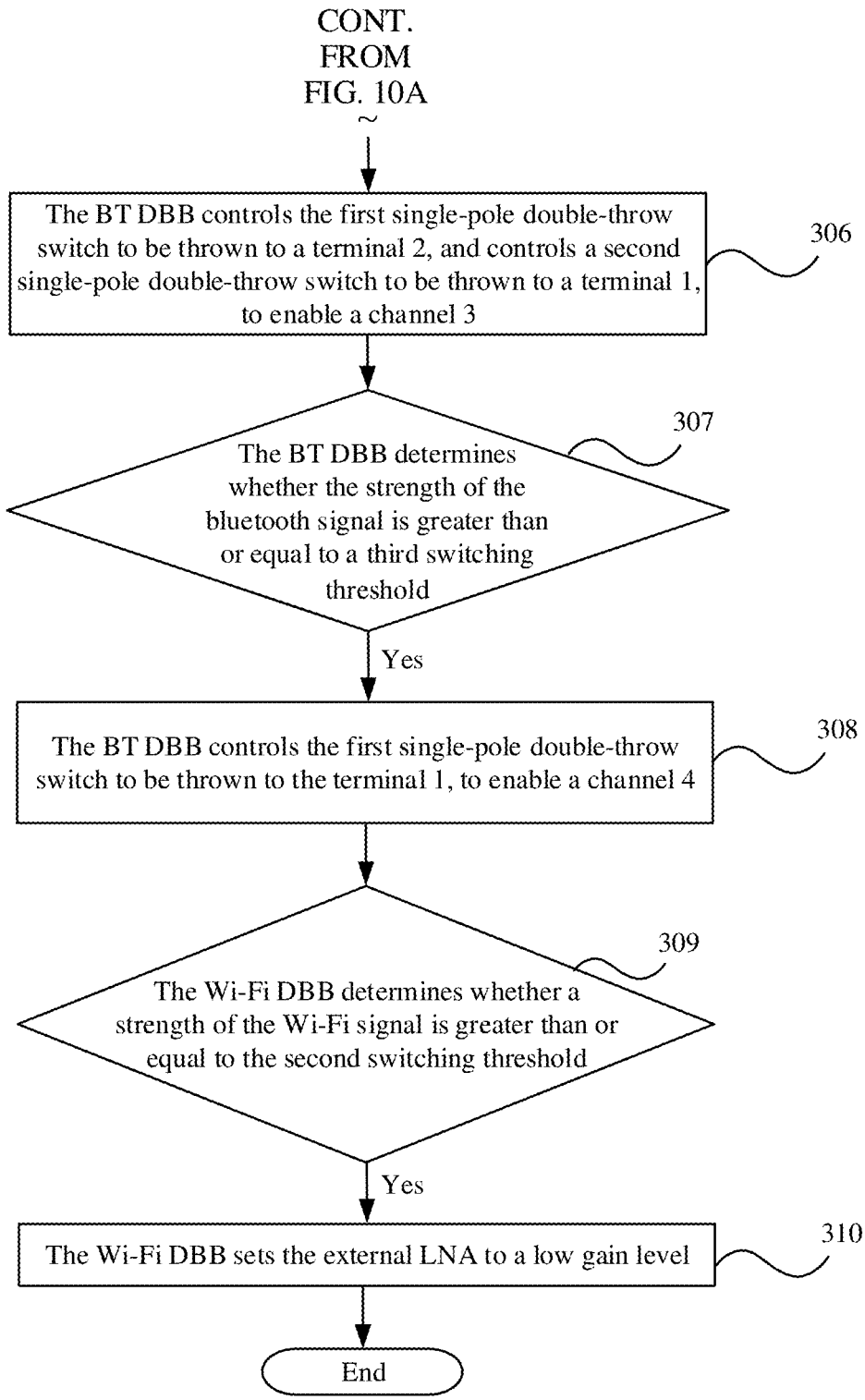

The following describes in detail a control method in an embodiment of the present disclosure with reference to FIG. 9. FIG. 10A and FIG. 10B are a schematic flowchart of a control method. In FIG. 10A and FIG. 10B, there are the following steps.

Step 301: A Wi-Fi DBB obtains control permission over an external LNA.

Step 302: A BT DBB and the Wi-Fi DBB respectively receive a bluetooth signal and a Wi-Fi signal.

Step 303: The BT DBB determines whether a strength of the bluetooth signal is greater than or equal to a first switching threshold.

For example, in this embodiment, that the first switching threshold is −70 dBm is used as an example for description. Specifically, the BT DBB determines, based on the received bluetooth signal, whether the strength of the bluetooth signal is greater than or equal to the first switching threshold. In an example, if the strength of the bluetooth signal is greater than or equal to the first switching threshold, step 304 is performed, and if the strength of the bluetooth signal is less than the first switching threshold, step 302 is performed repeatedly. In other words, the bluetooth signal continues to be received through a radio frequency channel 1.

Step 304: The BT DBB controls a first single-pole double-throw switch to be thrown to a terminal 1, to enable a radio frequency channel 2.

For example, if a BT DBB 540 determines that the strength of the bluetooth signal is greater than or equal to −70 dBm, the BT DBB 540 sends a control signal to a single-pole double-throw switch 920 through a control channel between the BT DBB 540 and the first single-pole double-throw switch, namely, the single-pole double-throw switch 920, to control the single-pole double-throw switch 920 to be thrown to a terminal 1, where the single-pole double-throw switch 930 is still thrown to the terminal 2, to enable the radio frequency channel 2. The BT DBB 540 receives, through a radio frequency channel 2, a bluetooth signal transmitted by an antenna 510. A power attenuator 910 may process the bluetooth signal, to reduce a gain in the bluetooth signal. In other words, the gain can be reduced by using the power attenuator.

Step 305: The BT DBB determines whether a strength of the bluetooth signal is greater than or equal to a second switching threshold.

For example, in this embodiment, that the second switching threshold is −60 dBm is used as an example for description. Specifically, the BT DBB determines, based on the received bluetooth signal, whether the strength of the bluetooth signal is greater than or equal to the second switching threshold. In an example, if the strength of the bluetooth signal is greater than or equal to the second switching threshold, step 306 is performed, and if the strength of the bluetooth signal is less than the second switching threshold, no processing is performed. In other words, the bluetooth signal continues to be received through the radio frequency channel 2.

Step 306: The BT DBB controls the first single-pole double-throw switch to be thrown to a terminal 2, and controls a second single-pole double-throw switch to be thrown to a terminal 1, to enable a radio frequency channel 3.

For example, if the BT DBB 540 determines that the strength of the bluetooth signal is greater than or equal to −60 dBm, the BT DBB 540 respectively sends a control signal to the single-pole double-throw switch 920 and the single-pole double-throw switch 930 through a control channel between the BT DBB 540 and the first single-pole double-throw switch, namely, the single-pole double-throw switch 920, and a control channel between the BT DBB 540 and the second single-pole double-throw switch, namely, the single-pole double-throw switch 930, to control the single-pole double-throw switch 930 to be thrown to a terminal 1 and control the single-pole double-throw switch 920 to be thrown to a terminal 2, so as to enable the radio frequency channel 3. The BT DBB 540 receives, through the radio frequency channel 3, the bluetooth signal transmitted by the antenna 510, to skip the external LNA (in other words, bypass the external LNA), thereby reducing a gain in the bluetooth signal.

In a possible implementation, the BT DBB may be further configured to: when determining that the strength of the bluetooth signal is greater than or equal to the first switching threshold, enable the radio frequency channel 3, in other words, skip the external LNA (bypass the external LNA), and then, when determining that the strength of the bluetooth signal is greater than or equal to the second switching threshold, enable the radio frequency channel 2. In other words, the power attenuator is used to reduce the gain.

Step 307: The BT DBB determines whether the strength of the bluetooth signal is greater than or equal to a third switching threshold.

For example, in this embodiment, that the third switching threshold is −50 dBm is used as an example for description.

Specifically, the BT DBB determines, based on the received bluetooth signal, whether the strength of the bluetooth signal is greater than or equal to the third switching threshold. In an example, if the strength of the bluetooth signal is greater than or equal to the third switching threshold, step 308 is performed, and if the strength of the bluetooth signal is less than the third switching threshold, no processing is performed. In other words, the bluetooth signal continues to be received through the radio frequency channel 3.

Step 308: The BT DBB controls the first single-pole double-throw switch to be thrown to the terminal 1, to enable a radio frequency channel 4.

For example, if the BT DBB 540 determines that the strength of the bluetooth signal is greater than or equal to −50 dBm, the BT DBB 540 sends a control signal to the single-pole double-throw switch 920 through the control channel between the BT DBB 540 and the first single-pole double-throw switch, namely, the single-pole double-throw switch 920, to control the single-pole double-throw switch 920 to be thrown to the terminal 1, where the single-pole double-throw switch 920 is still thrown to the terminal 1, to enable the radio frequency channel 4. The BT DBB 540 receives, through the radio frequency channel 4, the bluetooth signal transmitted by the antenna 510, to skip the external LNA (in other words, bypass the external LNA), thereby reducing the gain in the bluetooth signal. Further, the power attenuator 910 is used to process the bluetooth signal, to further reduce the gain in the bluetooth signal.

It should be noted that, in this case, the Wi-Fi DBB 550 still has control permission over the external LNA, and the external LNA is still at a high gain level, to ensure a signal-to-noise ratio of the Wi-Fi signal when an anti-interference requirement of the BT DBB is met.

Step 309: The Wi-Fi DBB determines whether a strength of the Wi-Fi signal is greater than or equal to a fourth switching threshold.

Step 310: The Wi-Fi DBB sets the external LNA to a low gain level.

Scenario 4

Figure 11:
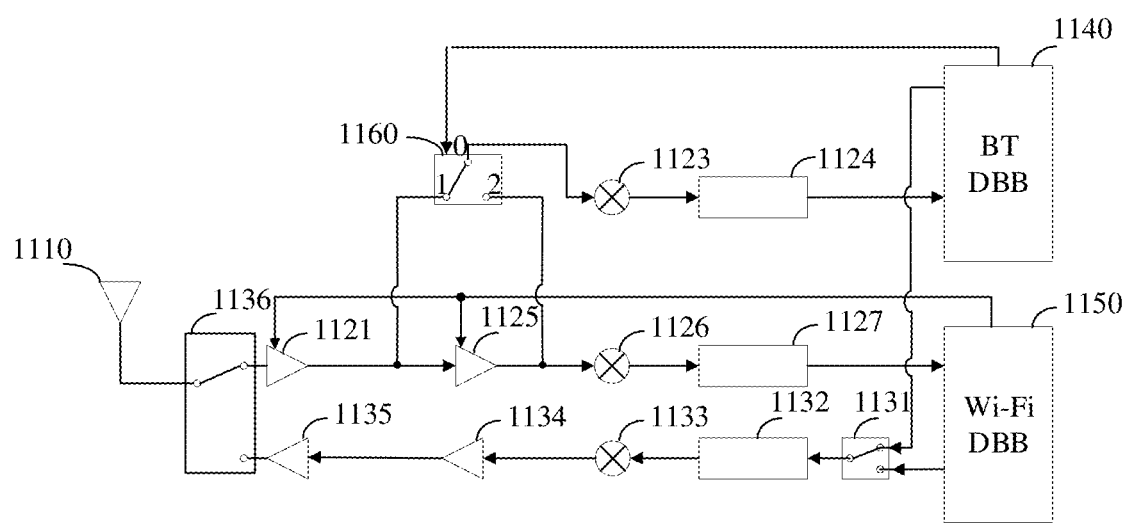
FIG. 11 is a schematic diagram of a structure of a short-range communications apparatus according to an embodiment of the present disclosure.

FIG. 11 is a schematic diagram of a structure of a short-range communications apparatus according to an embodiment of the present disclosure. Refer to FIG. 11. A BT DBB 1140 and a Wi-Fi DBB 1150 each are coupled to an antenna 1110 through a radio frequency receive channel and a radio frequency transmit channel.

For example, in this embodiment, the BT DBB 1140 is coupled to the antenna 1110 through the radio frequency receive channel (including a radio frequency channel 1 or a radio frequency channel 2). Devices such as an external LNA 1121, an internal LNA 1125, a mixer 1123, and an RX ABB 1124 are disposed on the radio frequency channel 1, and devices such as the external LNA 1121, the mixer 1123, and the RX ABB 1124 are disposed on the radio frequency channel 2. The external LNA may also be referred to as a shared external LNA, and the internal LNA may also be referred to as a shared internal LNA. For example, an input port of the external LNA 1121 is coupled to the antenna 1110, and an input port of an internal LNA 1125 is coupled to an output port of the external LNA 1121.

Continue to refer to FIG. 11. In this embodiment, a single-pole double-throw switch 1160 exists between the radio frequency channel 1 and the radio frequency channel 2, and includes a terminal 0, a terminal 1, and a terminal 2. The terminal 0 is a non-movable end, and the terminal 1 and the terminal 2 are movable ends. The terminal 0 is coupled to the BT DBB 1140, the terminal 1 is coupled to the input port of the internal LNA 1125, the terminal 2 is coupled to an output port of the internal LNA 1125, and the single-pole double-throw switch 1160 is configured to control an enabling state of the radio frequency channel 1 and the radio frequency channel 2.

Optionally, in this embodiment, the internal LNA 1125 forms a gain unit. In an example, if the single-pole double-throw switch 1160 is thrown to the terminal 1, in other words, the terminal 0 is connected to the terminal 1, the radio frequency channel 2 is enabled. In other words, the internal LNA 1125 is bypassed, and the antenna 1110 transmits a bluetooth signal to the BT DBB 1140 through the radio frequency channel 2. In another example, if the single-pole double-throw switch 1160 is thrown to the terminal 2, in other words, the terminal 0 is connected to the terminal 2, the radio frequency channel 1 is enabled. In other words, the antenna 1110 transmits a bluetooth signal to the BT DBB 1140 through the radio frequency channel 1. For example, in this embodiment, in an initial state, the single-pole double-throw switch 1160 is thrown to the terminal 2, to enable the radio frequency channel 1.

Still refer to FIG. 11. The antenna 1110 and the Wi-Fi DBB 1150 are connected through the radio frequency receive channel (a radio frequency channel 3). Devices such as the external LNA 1121, the internal LNA 1125, a mixer 1126, and an RX ABB 1127 are disposed on the radio frequency channel 3. The antenna 1110 may transmit a Wi-Fi signal to the Wi-Fi DBB 1150 through the radio frequency channel 3.

Optionally, the BT DBB 1140 and the single-pole double-throw switch 1160 are connected through a control channel. Optionally, the Wi-Fi DBB 1150 is connected to the external LNA 1121 and the internal LNA 1125 through a control channel.

Figure 12:
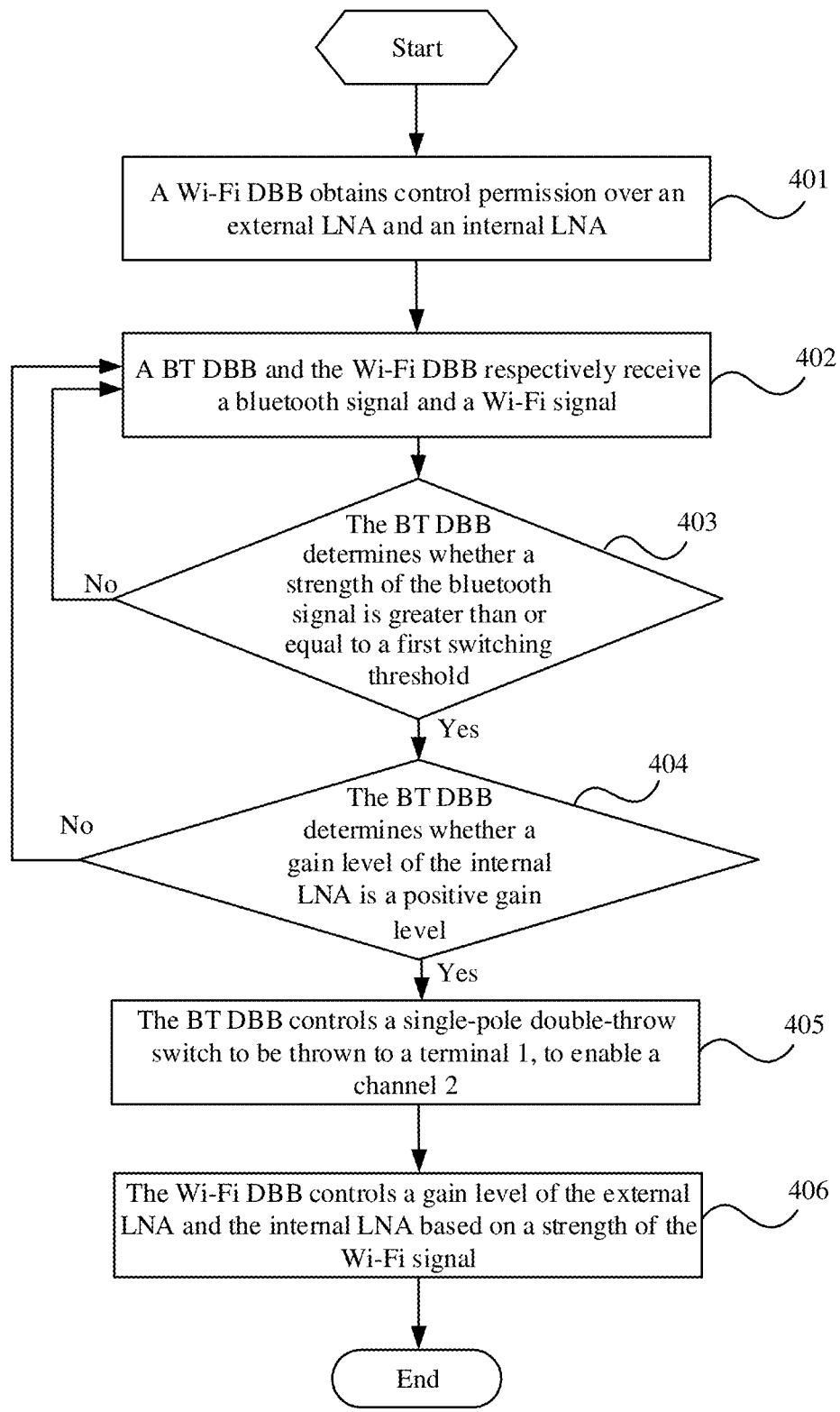
FIG. 12 is a schematic flowchart of a control method according to an embodiment of the present disclosure.

The following describes in detail a control method in an embodiment of the present disclosure with reference to FIG. 11. FIG. 12 is a schematic flowchart of a control method. In FIG. 12, there are the following steps.

Step 401: A Wi-Fi DBB obtains control permission over an external LNA and an internal LNA.

Step 402: A BT DBB and the Wi-Fi DBB respectively receive a bluetooth signal and a Wi-Fi signal.

Step 403: The BT DBB determines whether a strength of the bluetooth signal is greater than or equal to a first switching threshold.

For example, in this embodiment, that the first switching threshold is −70 dBm is used as an example for description. Specifically, the BT DBB 1140 determines, based on the received bluetooth signal, whether the strength of the bluetooth signal is greater than or equal to the first switching threshold. In an example, if the strength of the bluetooth signal is greater than or equal to the first switching threshold, step 404 is performed, and if the strength of the bluetooth signal is less than the first switching threshold, step 402 is repeatedly performed. In other words, the bluetooth signal continues to be received through a radio frequency channel 1.

Step 404: The BT DBB determines whether a gain level of the internal LNA is a positive gain level.

For example, as described above, the gain level of the LNA includes a positive gain level, to increase a gain in a signal, or may include a negative gain level, to increase a gain in a signal. The positive gain level and the negative gain level may further include a plurality of levels.

For example, if the BT DBB determines that the strength of the bluetooth signal is greater than or equal to −70 dBm, and the internal LNA is at the negative gain level, in other words, a gain reduction function is currently enabled for the internal LNA, the internal LNA does not need to be skipped. It can also be understood that if the internal LNA is skipped (in other words, the external LNA is bypassed), the gain in the signal is increased instead.

For example, if the BT DBB determines that the strength of the bluetooth signal is greater than or equal to −70 dBm, and the internal LNA is at the positive gain level, in other words, a gain increase function is currently enabled for the internal LNA, the internal LNA needs to be skipped (in other words, the external LNA is bypassed), to reduce a gain in the bluetooth signal, and step 404 is performed.

Step 405: The BT DBB controls a single-pole double-throw switch to be thrown to a terminal 1, to enable a radio frequency channel 2.

For example, if the BT DBB 1140 sends a control signal to a single-pole double-throw switch 1160 through a control channel between the BT DBB 1140 and the single-pole double-throw switch 1160, to control the single-pole double-throw switch 1160 to be thrown to the terminal 1 to enable the radio frequency channel 2. The BT DBB 1140 receives, through the radio frequency channel 2, a bluetooth signal transmitted by an antenna 1110, to skip the internal LNA, thereby reducing the gain in the bluetooth signal.

It should be noted that, in this case, the Wi-Fi DBB 1150 still has control permission over the external LNA and the internal LNA, and the external LNA and the internal LNA are still at a high gain level, to ensure a signal-to-noise ratio of the Wi-Fi signal when an anti-interference requirement of the BT DBB is met.

Step 406: The Wi-Fi DBB controls a gain level of the external LNA and the internal LNA based on a strength of the Wi-Fi signal.

For example, the Wi-Fi DBB may control the gain level of the external LNA and the internal LNA based on the strength of the Wi-Fi signal. For specific details, refer to an embodiment of an existing technology. This is not limited in the present disclosure.

Scenario 5

Figure 13:
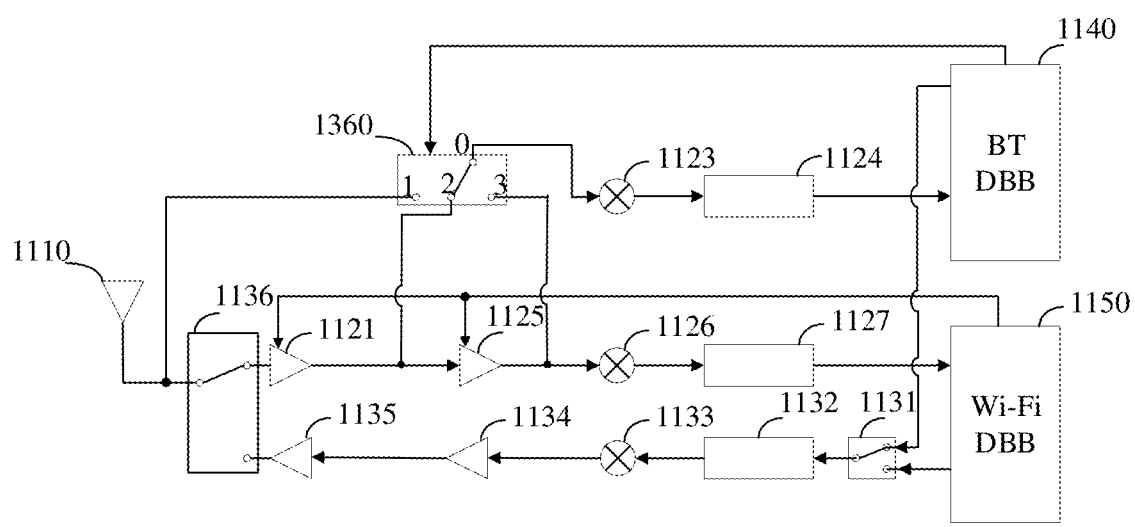
FIG. 13 is a schematic diagram of a structure of a short-range communications apparatus according to an embodiment of the present disclosure.

FIG. 13 is a schematic diagram of a structure of a short-range communications apparatus according to an embodiment of the present disclosure. Refer to FIG. 13. A BTDBB 1140 and a Wi-Fi DBB 1150 each are coupled to an antenna 1110 through a radio frequency receive channel and a radio frequency transmit channel.

For example, in this embodiment, the BT DBB 1140 is coupled to the antenna 1110 through the radio frequency receive channel (including a radio frequency channel 1 and a radio frequency channel 2). Devices such as an external LNA 1121, an internal LNA 1125, a mixer 1123, and an RX ABB 1124 are disposed on the radio frequency channel 1, devices such as the external LNA 1121, the mixer 1123, and the RX ABB 1124 are disposed on the radio frequency channel 2, and devices such as the mixer 1123 and the RX ABB 1124 are disposed on a radio frequency channel 3. The external LNA may also be referred to as a shared external LNA, and the internal LNA may also be referred to as a shared internal LNA. For example, an input port of the external LNA 1121 is coupled to the antenna 1110, and an output port of the external LNA 1121 is coupled to the internal LNA 1125.

Continue to refer to FIG. 13. In this embodiment, a single-pole triple-throw switch 1360 exists between the radio frequency channel 1, the radio frequency channel 2, and a radio frequency channel 3, and includes a terminal 0, a terminal 1, a terminal 2, and a terminal 3. The terminal 0 is a non-movable end, and the terminal 1, and the terminal 2, and the terminal 3 are movable ends. The terminal 0 is coupled to the BT DBB 1140, the terminal 1 is coupled to the input port of the external LNA 1121, the terminal 2 is coupled to an input port of the internal LNA 1125, and the terminal 3 is coupled to an output port of the internal LNA 1125.

Optionally, in this embodiment, the external LNA 1121 and the internal LNA 1125 form a gain unit. In an example, the single-pole triple-throw switch 1360 is thrown to the terminal 3, to enable the radio frequency channel 1. In another example, the single-pole triple-throw switch 1360 is thrown to the terminal 2, to enable the radio frequency channel 2, in other words, bypass the internal LNA 1125 in the gain unit. In still another example, the single-pole triple-throw switch 1360 is thrown to the terminal 1, to enable the radio frequency channel 3, in other words, bypass the internal LNA 1125 and the external LNA 1121 in the gain unit. For example, in this embodiment, in an initial stage, it is considered by default that the single-pole triple-throw switch 1360 is thrown to the terminal 3. In other words, the radio frequency channel 1 is enabled.

Still refer to FIG. 13. The antenna 1110 and the Wi-Fi DBB 1150 are connected through the radio frequency receive channel (a radio frequency channel 4). Devices such as the external LNA 1121, the internal LNA 1125, a mixer 1126, and an RX ABB 1127 are disposed on the radio frequency channel 4. The antenna 1110 may transmit a Wi-Fi signal to the Wi-Fi DBB 1150 through the radio frequency channel 4.

Optionally, the BT DBB 1140 and the single-pole triple-throw switch 1360 are connected through a control channel. Optionally, the Wi-Fi DBB 1150 is connected to the external LNA 1121 and the internal LNA 1125 through a control channel.

Figure 14:
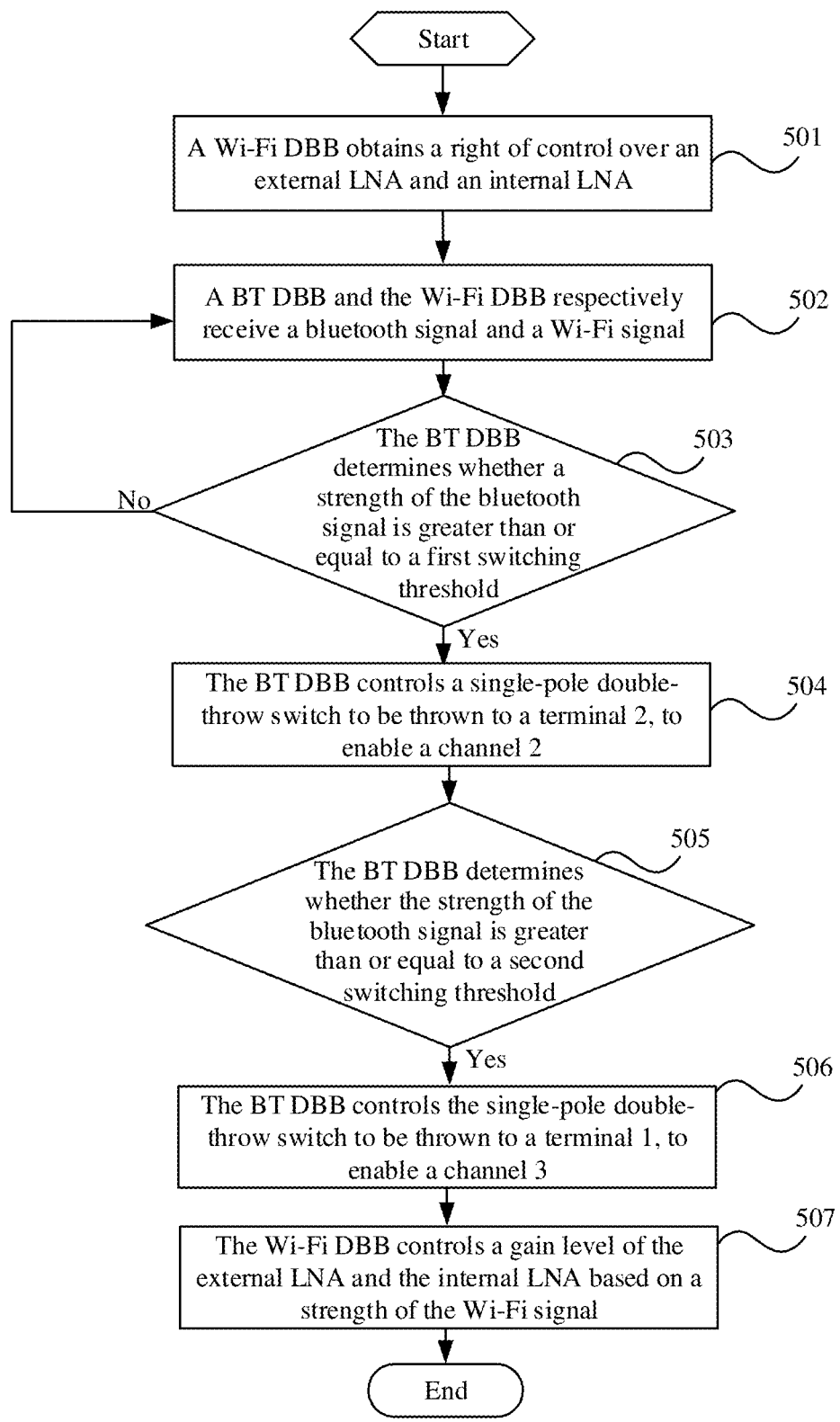
FIG. 14 is a schematic flowchart of a control method according to an embodiment of the present disclosure.

The following describes in detail a control method in an embodiment of the present disclosure with reference to FIG. 13. FIG. 14 is a schematic flowchart of a control method. In FIG. 14, there are the following steps.

Step 501: A Wi-Fi DBB obtains control permission over an external LNA and an internal LNA.

Step 502: A BT DBB and the Wi-Fi DBB respectively receive a bluetooth signal and a Wi-Fi signal.

Step 503: The BT DBB determines whether a strength of the bluetooth signal is greater than or equal to a first switching threshold.

For example, in this embodiment, that the first switching threshold is −70 dBm is used as an example for description. Specifically, the BT DBB determines, based on the received bluetooth signal, whether the strength of the bluetooth signal is greater than or equal to the first switching threshold. In an example, if the strength of the bluetooth signal is greater than or equal to the first switching threshold, step 504 is performed, and if the strength of the bluetooth signal is less than the first switching threshold, step 502 is performed repeatedly. In other words, the bluetooth signal continues to be received through a radio frequency channel 1.

Step 504: The BT DBB controls a single-pole double-throw switch to be thrown to a terminal 2, to enable a radio frequency channel 2.

Step 505: The BT DBB determines whether a strength of the bluetooth signal is greater than or equal to a second switching threshold.

For example, in this embodiment, that the first switching threshold is −30 dBm is used as an example for description. Specifically, the BT DBB 1140 determines, based on the received bluetooth signal, whether the strength of the bluetooth signal is greater than or equal to the second switching threshold. In an example, if the strength of the bluetooth signal is greater than or equal to the second switching threshold, step 506 is performed, and if the strength of the bluetooth signal is less than the second switching threshold, no processing is performed, and the bluetooth signal is still received through the radio frequency channel 2.

Step 506: The BT DBB controls the single-pole double-throw switch to be thrown to a terminal 1, to enable a radio frequency channel 3.

Step 507: The Wi-Fi DBB controls a gain level of the external LNA and the internal LNA based on a strength of the Wi-Fi signal.

It should be noted that in both embodiments of Scenario 1 and Scenario 2, the BT DBB and the Wi-Fi DBB determine a radio frequency channel based on a signal strength. In another embodiment, the BT DBB and the Wi-Fi DBB may report the strength of the obtained bluetooth signal or Wi-Fi signal to the processor, and the processor determines a radio frequency channel between the BT DBB and the antenna and a level of the external LNA and/or the internal LNA based on the strength of the bluetooth signal or the Wi-Fi signal, and sends radio frequency channel switching indication information to the BT DBB, and/or sends level switching indication information to the Wi-Fi DBB. Correspondingly, the BT DBB may enable a corresponding radio frequency channel based on the received radio frequency channel switching indication information, and the Wi-Fi DBB may control a switch of a gain level of the external LNA and/or the internal LNA based on the received level switching indication information. For another detail that is not described, refer to Scenario 1 to Scenario 3.

Further, it should be noted that, in descriptions in embodiments of the present disclosure, the BT DBB and the Wi-Fi DBB are used as an example for description. In another embodiment, the technical solutions in embodiments of the present disclosure may be further applied to a scenario in which two or more baseband processors share a gain unit. This is not limited in the present disclosure.

The following describes an apparatus provided in an embodiment of the present disclosure. The apparatus is shown in FIG. 15.

Figure 15:
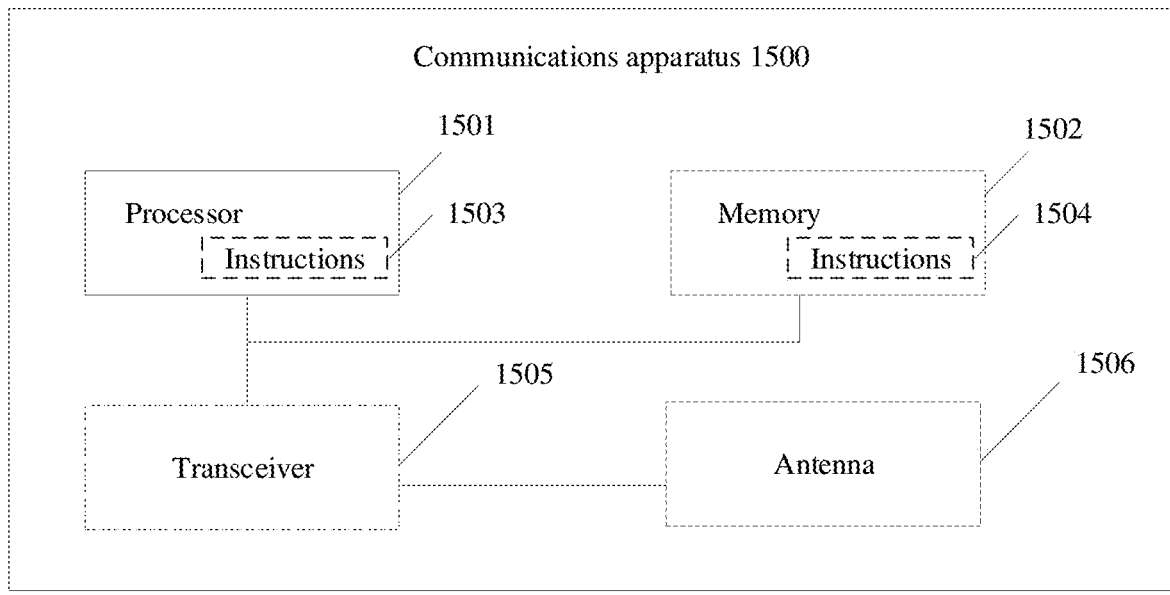
FIG. 15 is a schematic diagram of a structure of an apparatus according to an embodiment of the present disclosure.

FIG. 15 is a schematic diagram of a structure of a communications apparatus according to an embodiment of the present disclosure. As shown in FIG. 15, the communications apparatus 1500 may include a processor 1501 and a transceiver 1505, and optionally, further includes a memory 1502.

The transceiver 1505 may be referred to as a transceiver unit, a transceiver machine, a transceiver circuit, or the like, and is configured to implement a transceiver function. The transceiver 1505 may include a receiver and a transmitter. The receiver may be referred to as a receiver machine, a receiving circuit, or the like, and is configured to implement a receiving function. The transmitter may be referred to as a transmitter machine, a transmitter circuit, or the like, and is configured to implement a sending function.

The memory 1502 may store a computer program, software code, or instructions 1504. The computer program, software code, or instructions 1504 may also be referred to as firmware. The processor 1501 may run computer program, software code, or instructions 1503, or invoke the computer program, software code, or instructions 1504 stored in the memory 1502, to control a MAC layer and a PHY layer, so as to implement the control method provided in the following embodiments of the present disclosure. The processor 1501 may be a central processing unit (CPU), the memory 1502 may be, for example, a read-only memory (ROM), or a random access memory (RAM).

The processor 1501 and the transceiver 1505 described in the present disclosure may be implemented on an integrated circuit (IC), an analog IC, a radio frequency integrated circuit RFIC, a mixed signal IC, an application-specific integrated circuit (ASIC), a printed circuit boards (PCB), an electronic device, or the like.

The communications apparatus 1500 may further include an antenna 1506, and modules included in the communications apparatus 1500 are merely an example for description. This is not limited in the present disclosure.

As described above, the communications apparatus described in the foregoing embodiment may be a terminal, but a scope of the communications apparatus described in the present disclosure is not limited thereto, and a structure of the communications apparatus may not be limited by that in FIG. 15. The communications apparatus may be an independent device or may be part of a large device. For example, an implementation form of the communications apparatus may be as follows:

(1) an independent integrated circuit (IC), a chip, or a chip system or subsystem; (2) a set of one or more ICs, where optionally, the set of ICs may further include a storage component configured to store data or instructions; (3) a module that may be embedded into another device; (4) a receiver machine, an intelligent terminal, a wireless device, a handheld machine, a mobile unit, a vehicle-mounted device, a cloud device, an artificial intelligence device, or the like; (5) another form, or the like.

Figure 16:
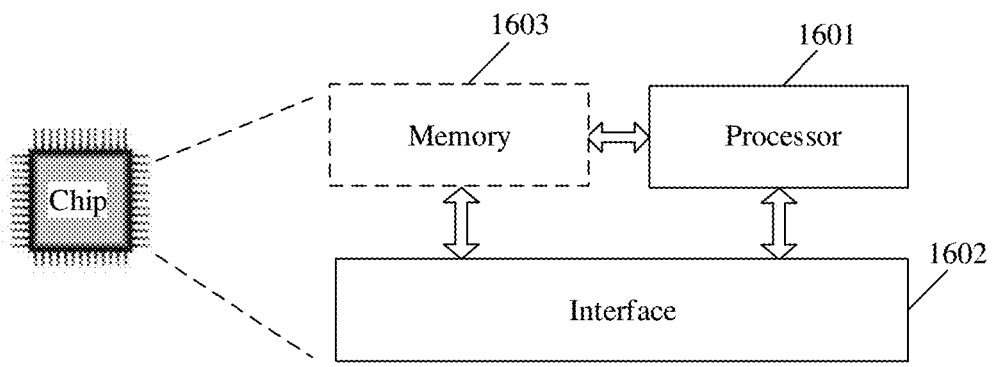
FIG. 16 is a schematic diagram of a structure of a chip according to an embodiment of the present disclosure.

For a case in which the implementation form of the communications apparatus is a chip or chip system, refer to a schematic diagram of a structure of a chip shown in FIG. 16. The chip shown in FIG. 16 includes a processor 1601 and an interface 1602. There may be one or more processors 1601, and there may be a plurality of interfaces 1602. Optionally, the chip or chip system may include a memory 1603.

In a possible implementation, a BT DBB and a Wi-Fi DBB are integrated on a chip, and another device including a radio frequency channel or an antenna is disposed outside the chip.

In another possible implementation, the BT DBB, the Wi-Fi DBB, and some of devices (for example, an internal LNA, or a mixer) on each radio frequency channel in embodiments of the present disclosure are integrated on the chip. The antenna, or the antenna and an external LNA, or the antenna, the external LNA, and a switch configured to bypass an LNA or a power attenuator in the present disclosure are disposed outside the chip.

All related content of the steps in the method embodiments may be cited in function descriptions of corresponding functional modules.

Based on a same technical concept, an embodiment of the present disclosure further provides a computer-readable storage medium. The computer-readable storage medium stores a computer program, the computer program includes at least one segment of code, and the at least one segment of code may be executed by a terminal device, to control the terminal device to implement the method embodiments.

Based on a same technical concept, an embodiment of the present disclosure further provides a computer program. When the computer program is executed by a terminal device, the method embodiments are implemented.

The program may be all or partially stored in a storage medium that is encapsulated with a processor, or may be partially or all stored in a memory that is not encapsulated with a processor.

Based on a same technical concept, an embodiment of the present disclosure further provides a processor. The processor is configured to implement the method embodiments. The processor may be a chip.

Method or algorithm steps described in combination with content disclosed in embodiments of the present disclosure may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other form well-known in the art. An example storage medium is coupled to the processor, to enable the processor to read information from and write information into the storage medium. Certainly, the storage medium may also be an integral part of the processor. The processor and the storage medium may be located in the ASIC. In addition, the ASIC may be located in a network device. Certainly, the processor and the storage medium may also exist in the network device as discrete components.

A person skilled in the art should be aware that in the one or more examples, functions described in embodiments of this application may be implemented by hardware, software, firmware, or any combination thereof. When the functions are implemented by using software, the functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another place. The storage medium may be any available medium that can be accessed by a general-purpose or dedicated computer.

The foregoing describes embodiments of the present disclosure with reference to the accompanying drawings, but the present disclosure is not limited to the foregoing specific implementations. The foregoing specific implementations are merely examples, but do not impose a limitation. Inspired by the present disclosure, a person of ordinary skill in the art may make various forms without departing from the protection scope of the purposes and claims of the present disclosure, and the forms fall within the protection scope of the present disclosure.

What is claimed is:

1. A short-range communications apparatus, comprising:
at least one gain device, coupled to an antenna;
a first radio frequency (RF) receive channel, coupled to the at least one gain device;
a first baseband processor, coupled to the first RF receive channel, and configured to receive a first signal from the antenna through the first RF receive channel;
a second RF receive channel, coupled to the at least one gain device; and
a second baseband processor, coupled to the second RF receive channel, and configured to receive a second signal from the antenna through the second RF receive channel, wherein the at least one gain device comprises:
a first low noise amplifier (LNA) and a power attenuator, wherein output port of the first LNA is separately coupled to the first RF receive channel and an input port of the power attenuator, and an input port of the first LNA is coupled to the antenna, and a first bypass switch is disposed between the second RF receive channel and the at least one gain device and is separately coupled to the input port of the power attenuator and an output port of the power attenuator, and is configured to selectively bypass the power attenuator.

2. The apparatus according to claim 1, wherein the first bypass switch is configured to selectively bypass the power attenuator based on whether a strength of the second signal is greater than a second threshold.

3. The apparatus according to claim 1, wherein
a second bypass switch is disposed between the first LNA and the power attenuator, the second bypass switch is separately coupled to the input port of the first LNA and the output port of the first LNA, and the second bypass switch is configured to selectively bypass the first LNA.

4. The apparatus according to claim 3, wherein
the first bypass switch is configured to selectively bypass the power attenuator based on whether a strength of the second signal is greater than a third threshold;
the second bypass switch is configured to selectively bypass the first LNA based on whether the strength of the second signal is greater than a fourth threshold; and
the third threshold is greater than the fourth threshold.

5. The apparatus according to claim 1, wherein
the first LNA is disposed between a second LNA and the antenna; and
the first LNA is integrated with the first RF receive channel, the first baseband processor, the second RF receive channel, and the second baseband processor.

6. The apparatus according to claim 1, wherein
the second baseband processor is configured to control an off/on state of the first bypass switch.

7. The apparatus according to claim 1, wherein
the first baseband processor is configured to control a gain level of the first LNA.

8. The apparatus according to claim 1, wherein the first RF receive channel comprises
an internal LNA, a mixer, and/or a receive analog baseband (RX ABB).

9. The apparatus according to claim 1, wherein the second RF receive channel comprises
an internal LNA, a mixer, and/or a receive analog baseband (RX ABB).

10. A chip, comprising:
a first radio frequency (RF) receive channel, coupled to at least one gain device, wherein the at least one gain device is coupled to an antenna;
a first baseband processor, configured to receive a first signal from the antenna through the first radio frequency (RF) receive channel;
a second RF receive channel, coupled to the at least one gain device; and
a second baseband processor, configured to receive a second signal from the antenna through the second RF receive channel, wherein a first bypass switch is disposed between the second RF receive channel and the at least one gain device, wherein
the second baseband processor is further configured to control the first bypass switch to selectively bypass the at least one gain device,
wherein the at least one device comprises:
a first LNA and a power attenuator, wherein an output port of the first LNA is separately coupled to the first RF receive channel and an input port of the power attenuator, and an input port of the first LNA is coupled to the antenna, wherein
the first bypass switch is separately coupled to the input port of the power attenuator and an output port of the power attenuator; and
the controlling of the first bypass switch to selectively bypass the at least one gain device comprises selectively bypassing the power attenuator.

11. The chip according to claim 10, wherein the second baseband processor is configured to control, based on whether a strength of the second signal is greater than a second threshold, the first bypass switch to selectively bypass the power attenuator.

12. The chip according to claim 10, wherein
a second bypass switch is disposed between the first LNA and the power attenuator, and the second bypass switch is separately coupled to the input port of the first LNA and the output port of the first LNA;
and
the second baseband processor is further configured to:
control the second bypass switch to selectively bypass the first LNA, and control the first bypass switch to selectively bypass the power attenuator.

13. The chip according to claim 12, wherein
the second baseband processor is configured to control, based on whether a strength of the second signal is greater than a third threshold, the first bypass switch to selectively bypass the power attenuator; and
the second baseband processor is configured to control, based on whether the strength of the second signal is greater than a fourth threshold, wherein the third threshold is greater than the fourth threshold, the second bypass switch to selectively bypass the first LNA.

14. A control method, applied to a short-range communications apparatus, wherein the method comprises:
receiving a first signal from an antenna through a first radio frequency (RF) receive channel, wherein the first RF receive channel is coupled to at least one gain device coupled to the antenna and a first low noise amplifier (LNA) that is coupled to the antenna via an input port, an output port of the first LNA being separately coupled to the first RF receive channel da put port of a power attenuator;
receiving a second signal from the antenna through a second RF receive channel, wherein the second RF receive channel is coupled to the at least one gain device, and a first bypass switch is disposed between the second RF receive channel and the at least one gain device, and is separately coupled to the input port of the power attenuator and an output port of the power attenuator; and
controlling the first bypass switch to selectively bypass the at least one gain device, wherein the controlling of the first bypass switch to selectively bypass the at least one gain device comprises selectively bypassing the power attenuator.

* * * * *